United States Patent
Poutanen

(10) Patent No.: US 8,078,642 B1
(45) Date of Patent: Dec. 13, 2011

(54) CONCURRENT TRAVERSAL OF MULTIPLE BINARY TREES

(75) Inventor: Tomi Poutanen, Toronto (CA)

(73) Assignee: Yahoo! Inc., Sunnyvale, CA (US)

( * ) Notice: Subject to any disclaimer, the term of this patent is extended or adjusted under 35 U.S.C. 154(b) by 328 days.

(21) Appl. No.: 12/509,329

(22) Filed: Jul. 24, 2009

(51) Int. Cl.
*G06F 17/30* (2006.01)

(52) U.S. Cl. .......................... 707/797; 707/764; 707/706

(58) Field of Classification Search .................. 707/706, 707/736, 764, 778, 793, 797, 802
See application file for complete search history.

(56) References Cited

U.S. PATENT DOCUMENTS

| | | | |
|---|---|---|---|
| 6,785,687 B2 * | 8/2004 | Baskins et al. ...................... | 1/1 |
| 6,816,856 B2 * | 11/2004 | Baskins et al. ...................... | 1/1 |
| 7,194,456 B2 * | 3/2007 | Longshaw ............................ | 1/1 |
| 7,478,109 B1 * | 1/2009 | Panigrahy et al. .................... | 1/1 |

OTHER PUBLICATIONS

SIMD, In computing, SIMD (Single Instruction, Multiple Data; colloquially, "vector instructions," is a technique employed to achieve data level parallelism, printed Jul. 22, 2009, 5 pages.
Salford Systems, "Frequently Asked Questions and Answers about TreeNet," printed Jul. 22, 2009, 4 pages.
TreeNet, "About Salford Systems," Jerome Friedman's Revolutionary New Contribution to Date Mining, an Alternative to Neural Nets and Support Vector Machines, printed Jul. 22, 2009, 2 pages.

\* cited by examiner

*Primary Examiner* — Cam-Linh Nguyen
(74) *Attorney, Agent, or Firm* — SNR Denton US LLP

(57) ABSTRACT

In one embodiment, a tree traversal sequentially processes every level of two or more binary trees until reaching a leaf node for each the binary trees. Processing each level of the binary trees comprises: determining whether each traversed node of the remaining binary trees at the level is a non-leaf node or a leaf node; for the traversed leaf nodes at the level, remove the binary trees to which the leaf nodes belong from the remaining binary trees; and iteratively evaluating the traversed non-leaf nodes at the level of every n remaining binary trees until the non-leaf nodes at the level of all of the remaining binary trees are evaluated, where $n \geq 2$ and evaluating the non-leaf nodes of each n binary trees comprises concurrently evaluating the n non-leaf nodes of the n binary trees to determine to which one of the two child nodes of each of the n non-leaf nodes to traverse.

50 Claims, 11 Drawing Sheets

← 200

← 210

212 → George Washington - Wikipedia, the free encyclopedia
214 → George Washington was the leader of the Continental Army in the American Revolutionary War (1775–1783) and served as the first President of the
216 → United States of America (1789–1797).
en.wikipedia.org/wiki/George_Washington - 257k - Cached

← 220

222 → Biography of George Washington
224 → WhiteHouse.gov is the official web site for the White House and President Barack Obama, the 44th President of the United States. This site is a source
226 → for ...
www.whitehouse.gov/about/presidents/georgewashington - 54k - Cached

← 230

232 → George Washington: Biography from Answers.com
234 → George Washington , U.S. President / Military Leader / Revolutionary War Figure Born: 22 February 1732 Birthplace: Westmoreland County, Virginia
236 → Died:
www.answers.com/topic/george-washington - 480k - Cached

← 240

242 → President George Washington
244 → US Presidential Trivia for fun and learning. The site also has lesson ideas
246 → and activities for K-12 students. This page features George Washington.
www.classroomhelp.com/lessons/Presidents/washington.html - Cached

← 250

252 → American President: George Washington
254 → In-depth essays created by the University of Virginia on George Washington's life and administration. ... George Washington. At a Glance.
256 → Term: 1st President ...
millercenter.org/academic/americanpresident/washington - Cached

FIGURE 2

CONCURRENT TRAVERSAL OF MULTIPLE BINARY TREES

TECHNICAL FIELD

The present disclosure generally relates to traversing binary trees and more specifically relates to concurrently traversing multiple binary decision trees.

BACKGROUND

In the context of computer science, a "tree" is a commonly-used data structure that emulates a hierarchical tree structure with a set of linked nodes. A "binary tree" is a more specific type of tree in which the nodes each has at most two child nodes. A "binary decision tree" is a more specific type of binary tree in which the root node and the intermediate nodes each represents a condition having one or two possible outcomes, e.g., the condition is either satisfied or not satisfied, leading to the two child nodes respectively. "Tree traversal" is a process of visiting some or all of the nodes in a tree in a systematic way.

Trees have a great variety of applications. In practice, almost all tree applications require traversing the trees at one time or another and often repeatedly. The complexity of tree traversal increases as the complexity of a tree increases, e.g., as the number of nodes in the tree or the levels of the tree grow. Consequently, tree traversal is often a very expensive process, e.g., in terms of time or resource consumption. In addition, many applications require the traversal of multiple decision trees. For example, in Machine Learning applications, a predictive model often requires the evaluation of multiple decision trees, i.e., traversing multiple decision trees, for any one set of input.

SUMMARY

The present disclosure generally relates to traversing binary trees and more specifically relates to concurrently traversing multiple binary decision trees.

In particular embodiments, a tree traversal accesses m binary trees, where (1) m denotes an integer greater than or equal to 2, (2) the m binary trees each comprises one or more non-leaf nodes, two or more leaf nodes, and one or more levels, (3) the non-leaf nodes of each of the m binary trees comprises one root node and zero or more intermediate nodes, and (4) for each of the m binary trees, the non-leaf nodes each has two child nodes, the intermediate nodes and the leaf nodes each has one parent node, and the levels each comprises one or more of the non-leaf or leaf nodes.

The tree traversal sequentially processes every one of the levels of the m binary trees until reaching a leaf node for each the m binary trees. Processing each one of the levels of the m binary trees comprises: (I) determine whether one or more traversed nodes of one or more remaining of the m binary trees at the level are each a non-leaf node or a leaf node, where: (1) the remaining binary trees each has one its non-leaf or leaf nodes at the level as one of the traversed nodes, and (2) the traversed nodes at the level each is the root node of one of the m binary trees or has been determined as a result of evaluating its parent node; (II) for the leaf nodes at the level, remove the binary trees to which the leaf nodes belong from the remaining binary trees; and (III) iteratively evaluate the non-leaf nodes at the level of every n of the remaining binary trees until the non-leaf nodes at the level of all of the remaining binary trees are processed, where: (1) n denotes an integer greater than or equal to 2, and (2) evaluating the non-leaf nodes of each n binary trees comprises concurrently evaluating the n non-leaf nodes of the n binary trees to determine to which one of the two child nodes of each of the n non-leaf nodes to traverse.

In particular embodiments, a tree traversal accesses m binary trees, where: (1) m denotes an integer greater than or equal to 2, (2) the m binary trees each comprises one root node, zero or more intermediate nodes, two or more leaf nodes, one root level, and one or more subsequent levels, and (3) for each of the m binary trees, the root node and the intermediate nodes each has two child nodes, the intermediate nodes and the leaf nodes each has one parent node, the root level comprises the root node, and the subsequent levels each comprises one or more of the intermediate or leaf nodes.

The tree traversal processes the root level of the m binary trees by iteratively evaluating the root nodes of every n of the m binary trees until the root nodes of all of the m binary trees are processed, where n denoting an integer greater than or equal to 2. Evaluating the root nodes of each n binary trees comprises concurrently evaluating the n root nodes of the n binary trees to determine to which one of the two child nodes of each of the n root nodes to traverse.

The tree traversal sequentially processes every one of the subsequent levels of the m binary trees until reaching a leaf node for each the m binary trees. Processing each one of the subsequent levels of the m binary trees comprises: (I) determine whether one or more traversed nodes of one or more remaining of the m binary trees at the subsequent level are each an intermediate node or a leaf node, where: (1) the remaining binary trees each has one its intermediate or leaf nodes at the subsequent level as one of the traversed nodes, and (2) the traversed nodes at the subsequent level each has been determined as a result of evaluating its parent node; (II) for the leaf nodes at the subsequent level, remove the binary trees to which the leaf nodes belong from the remaining binary trees; and (III) iteratively evaluate the intermediate nodes at the subsequent level of every n of the remaining binary trees until the intermediate nodes at the subsequent level of all of the remaining binary trees are processed, where evaluating the intermediate nodes of each n binary trees comprises concurrently evaluating the n intermediate nodes of the n binary trees to determine to which one of the two child nodes of each of the n intermediate nodes to traverse.

These and other features, aspects, and advantages of the disclosure are described in more detail below in the detailed description and in conjunction with the following figures.

BRIEF DESCRIPTION OF THE DRAWINGS

FIG. 2 illustrates an example search result.

DETAILED DESCRIPTION

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figures 1A, 1B:
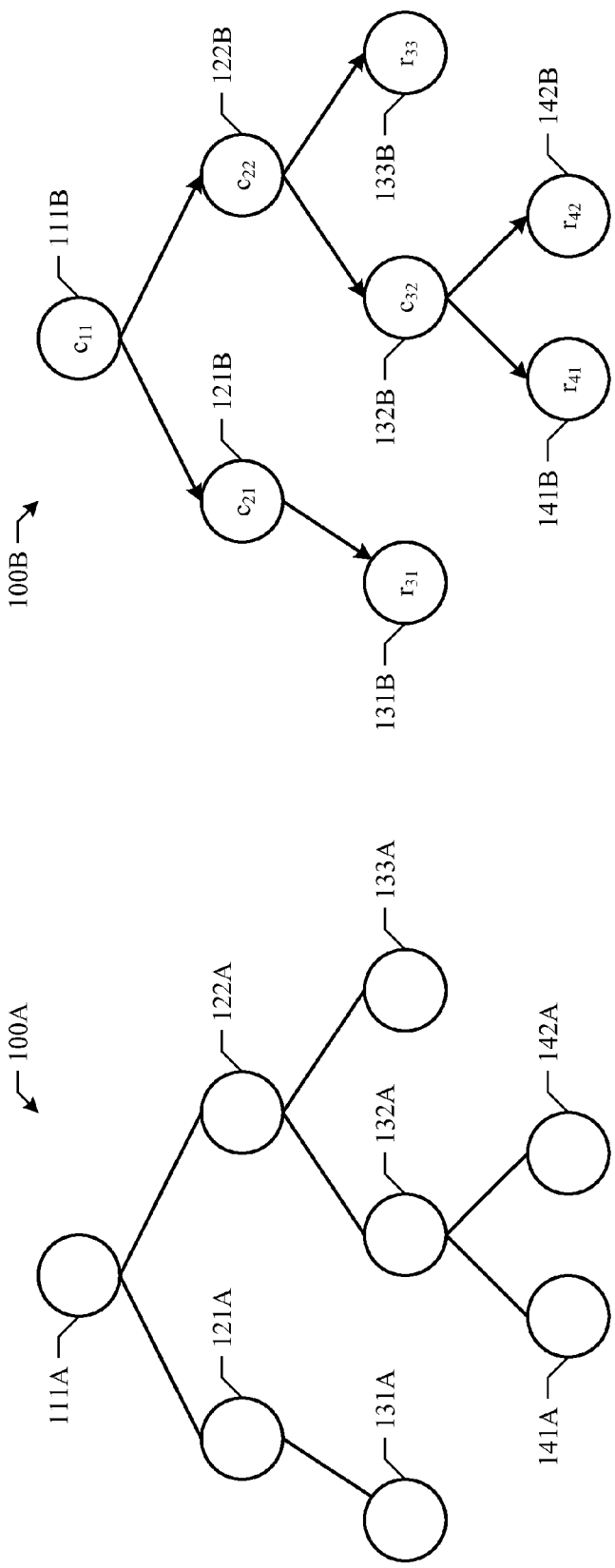
FIG. 1A illustrates an example binary tree.
FIG. 1B illustrates an example binary decision tree.

A binary tree is a data structure having one or more nodes arranged in a hierarchy and with each node having at most two child nodes. FIG. 1A illustrates an example binary tree 100A having nodes 110A-142A. Generally in a binary tree, the root node has no parent node; the intermediate nodes and the leaf nodes each has one parent node; the root node and the intermediate nodes each has one or two child nodes; and the leaf nodes have no child node. In binary tree 100A, node 111A is the root node; nodes 121A, 122A, and 132A are intermediate nodes; and nodes 131A, 133A, 141A, and 142A are leaf nodes.

A binary tree generally has one or more levels, and each level has one or more nodes. From the top of the binary tree, the first level, also referred to as the root level, has the root node. The subsequent levels each has one or more intermediate or leaf nodes. Binary tree 100A has four levels: the root level having root node 111A, the second level having intermediate nodes 121A and 122A, the third level having intermediate node 132A and leaf nodes 131A and 133A, and the fourth level having leaf nodes 141A and 142A.

A binary decision tree is a more specific type of binary tree in which the root node and the intermediate nodes each represents a condition, and the leaf nodes each represents a result. Traversing a binary decision tree generally arrives at a particular result represented by one of the leaf nodes depending on which of the conditions are satisfied along the process. FIG. 1B illustrates an example binary decision tree 100B derived from binary tree 100A and having nodes 111B-142B. In binary tree 100B, root node 111B represents condition $c_{11}$; intermediate nodes 121B, 122B and 132B represent conditions $c_{21}$, $c_{22}$, and $c_{32}$ respectively; and leaf nodes 131B, 133B, 141B, and 142B represent results $r_{31}$, $r_{33}$, $r_{41}$, and $r_{42}$ respectively. Suppose when traversing binary decision tree 100B, for each of root node 111B and intermediate nodes 121B, 122B and 132B, if the condition represented by the node is satisfied, the tree traversal proceeds to the left child node of the node and if the condition represented by the node is not satisfied, the tree traversal proceeds to the right child node of the node. Traversing binary decision tree 100B starting at root node 111B eventually leads to one of the results represented by a particular one of leaf nodes 131B, 133B, 141B, and 142B.

For example, at root node 111B, if condition $c_{11}$ is not satisfied, then the tree traversal proceeds to intermediate node 122B. At intermediate node 122B, if condition $c_{22}$ is satisfied, then the tree traversal proceeds to intermediate node 132B. At intermediate node 132B, if condition $c_{32}$ is also satisfied, then the tree traversal proceeds to leaf node 141B. In this case, the result of traversing binary decision tree 100B leads to result $r_{41}$, which is represented by leaf node 141B.

Binary decision trees have a great variety of applications, one of which is in the field of network search and more specifically in ranking network contents identified in response to search queries.

The Internet provides a vast amount of information. The individual pieces of information are often referred to as "network contents" and may have various formats, such as, for example, texts, audios, videos, images, web pages, documents, executables, etc. The network contents are stored at many different sites, such as on computers and servers, in databases, etc., around the world. These different sites are communicatively linked to the Internet through various network infrastructures. Any person may access the publicly available network contents via a suitable network device connected to the Internet.

Due to the sheer amount of information available on the Internet, it is impractical as well as impossible for a person, e.g., a network user, to manually search throughout the Internet for specific pieces of information. Instead, most people rely on different types of computer-implemented tools to help them locate the desired network contents. One of the most commonly and widely used tools is a search engine, such as the search engines provided by Yahoo!® Inc. (http://search.yahoo.com) and Google™ (http://www.google.com). To search for information relating to a specific subject matter on the Internet, a network user typically provides a short phrase describing the subject matter, often referred to as a "search query", to a search engine. The search engine conducts a search based on the query phrase using various search algorithms and generates a search result that identifies network contents that are most likely to be related to the search query. The network contents are presented to the network user, often in the form of a list of links, each link being associated with a different web page that contains some of the identified network contents. The network user is then able to click on the links to view the specific network contents contained in the corresponding web pages as he wishes.

Sophisticated search engines implement many other functionalities in addition to merely identifying the network contents as a part of the search process. For example, a search engine usually ranks the identified network contents according to their relative degrees of relevance with respect to the search query, such that the network contents that are relatively more relevant to the search query are ranked higher and consequently are presented to the network user before the network contents that are relatively less relevant to the search query. The search engine may also provide a short summary of each of the identified network contents.

FIG. 2 illustrates an example search result 200 that identifies five network contents 210, 220, 230, 240, 250. Search result 200 is generated in response to an example search query "President George Washington". Note that only five network contents are illustrated in order to simplify the discussion. In practice, a search result may identify hundreds, even thousands of network contents. Network contents 210, 220, 230, 240, 250 each includes a title 212, 222, 232, 242, 252, a short summary 214, 224, 234, 244, 254 that briefly describes the respective network content, and a clickable link 216, 226, 236, 246, 256 in the form of a Uniform Resource Locator (URL). Network contents 210, 220, 230, 240, 250 are presented according to their relative degrees of relevance to search query "President George Washington". That is, network content 210 is considered slightly more relevant to search query "President George Washington" than network content 220, which is in turn considered slightly more relevant than network content 230, and so on. Consequently, network content 210 is presented first, i.e., at the top of search result 200, followed by network content 220, network content 230, and so on.

To rank the network contents identified in response to a search query, particular embodiments employ a set of binary decision trees as part of a Machine Learning based predictive model. In particular embodiments, the network contents each has an associated set of features. For a particular network content, its associated features each describes a different characteristic of the network content. Different network contents may have different features. For example, features common to most network contents may include, without limitation, the time the network content is first created or published, the time the network content is last modified, the creator of the network content, the subject matter or description of the network content, the title of the network content, the size of the network content, the number of times the network content has been viewed or downloaded, the ratings or reviews given to the network content by network users, the URL of the network content, and so on. In addition, textual network contents may have features such as, without limitation, the words that appear most frequently in the network content, the literary category to which the network content belongs (e.g., news, fiction, non-fiction, poem, technical paper, etc.), the number of revisions the network content has, the number of matching search query terms in the network content, the frequency of occurrence of the search query terms in the network content, the proximity of matching search query terms in the network content, and so on. Multimedia network contents (e.g., audios, videos, or graphics) may have features such as, without limitation, the tags associated with the network content (e.g., album title, artist, genre, track title, etc.), the encoding format of the network content (e.g., MP3, JPEG, MPEG, GIF, etc.), the quality of the network content (e.g., bit rate, frame rate, etc.), the histogram of the network content, and so on.

Particular embodiments may represent the possible features associated with the network contents using a set of binary decision trees with each binary decision tree representing a subset of the possible features. The non-leaf nodes, i.e., the root nodes and the intermediate nodes, in the binary decision trees each has two child nodes and represents a threshold condition for a particular feature. The leaf nodes in the binary decision trees each represents a score used to rank the network contents.

Figure 3A:
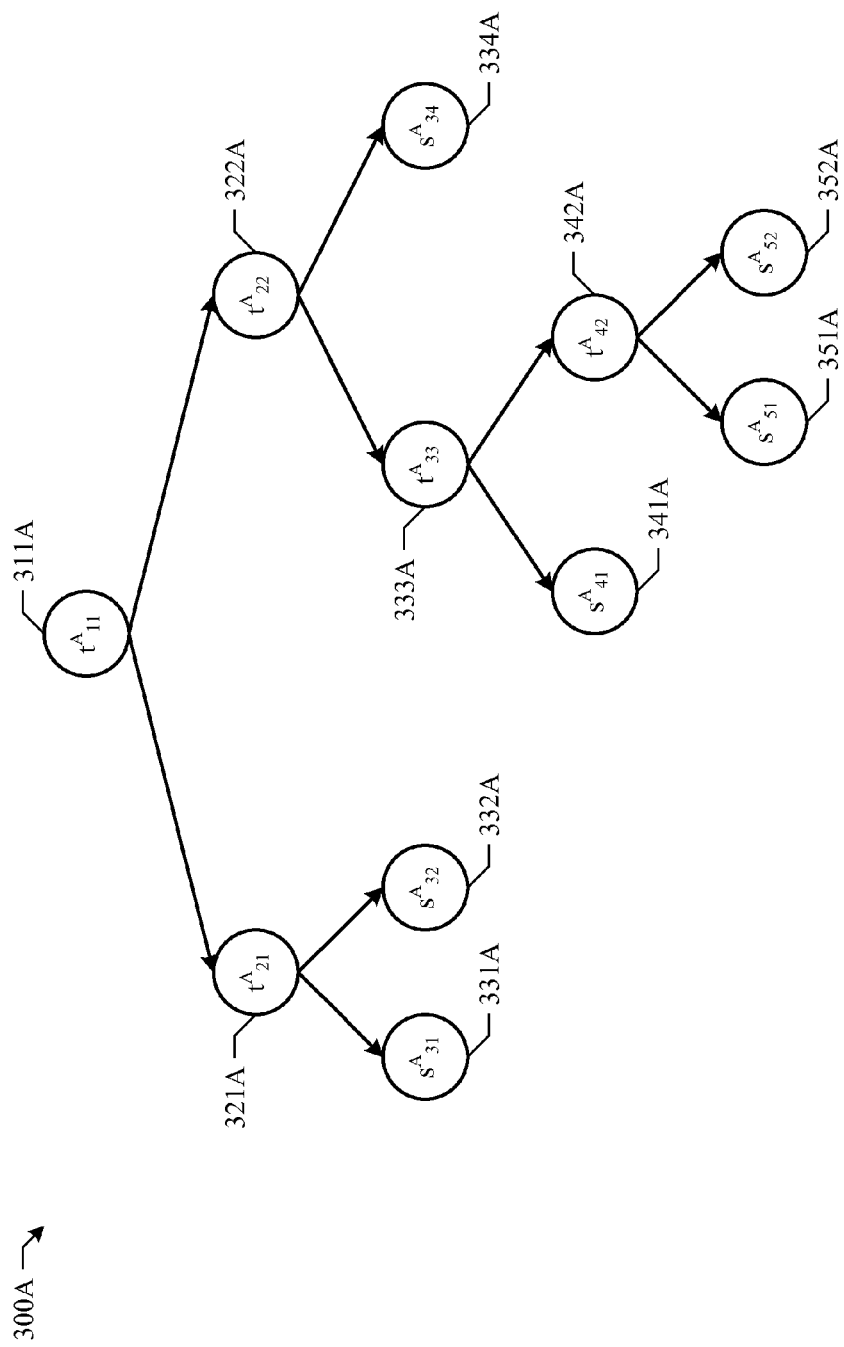
FIGS. 3A-3F illustrates six example binary decision trees having different number of nodes and levels and representing thresholds of different network content features.
Figure 3B:
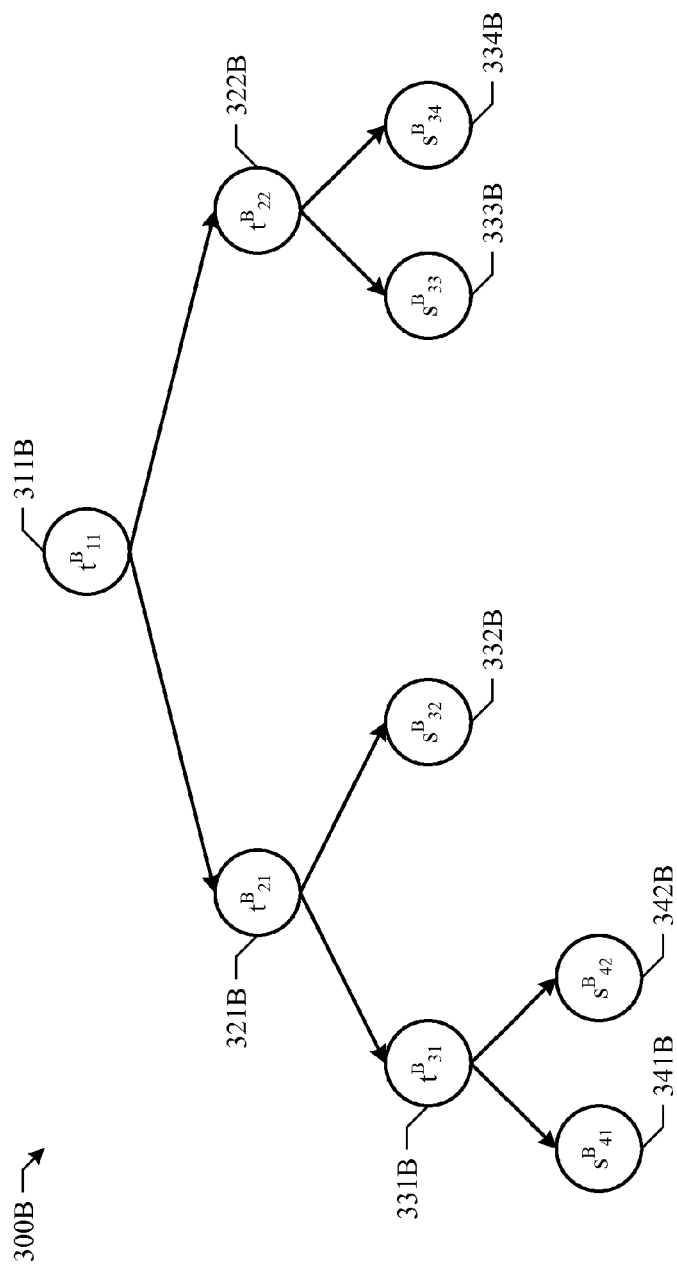
Figure 3C:
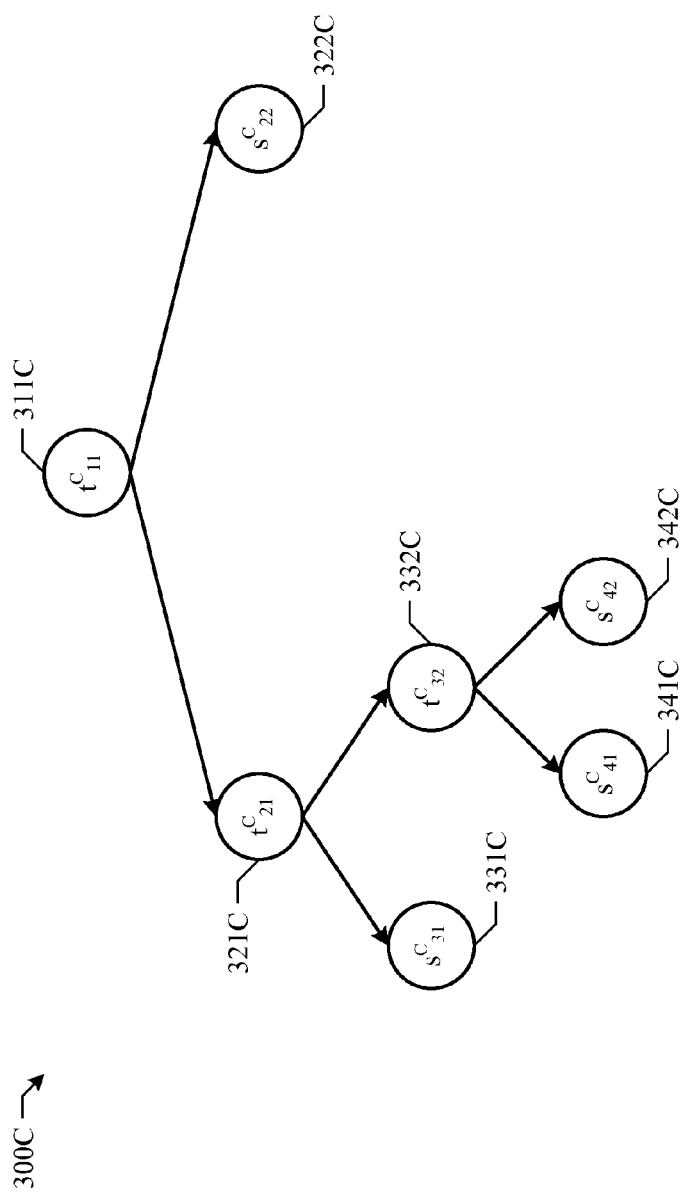
Figure 3D:
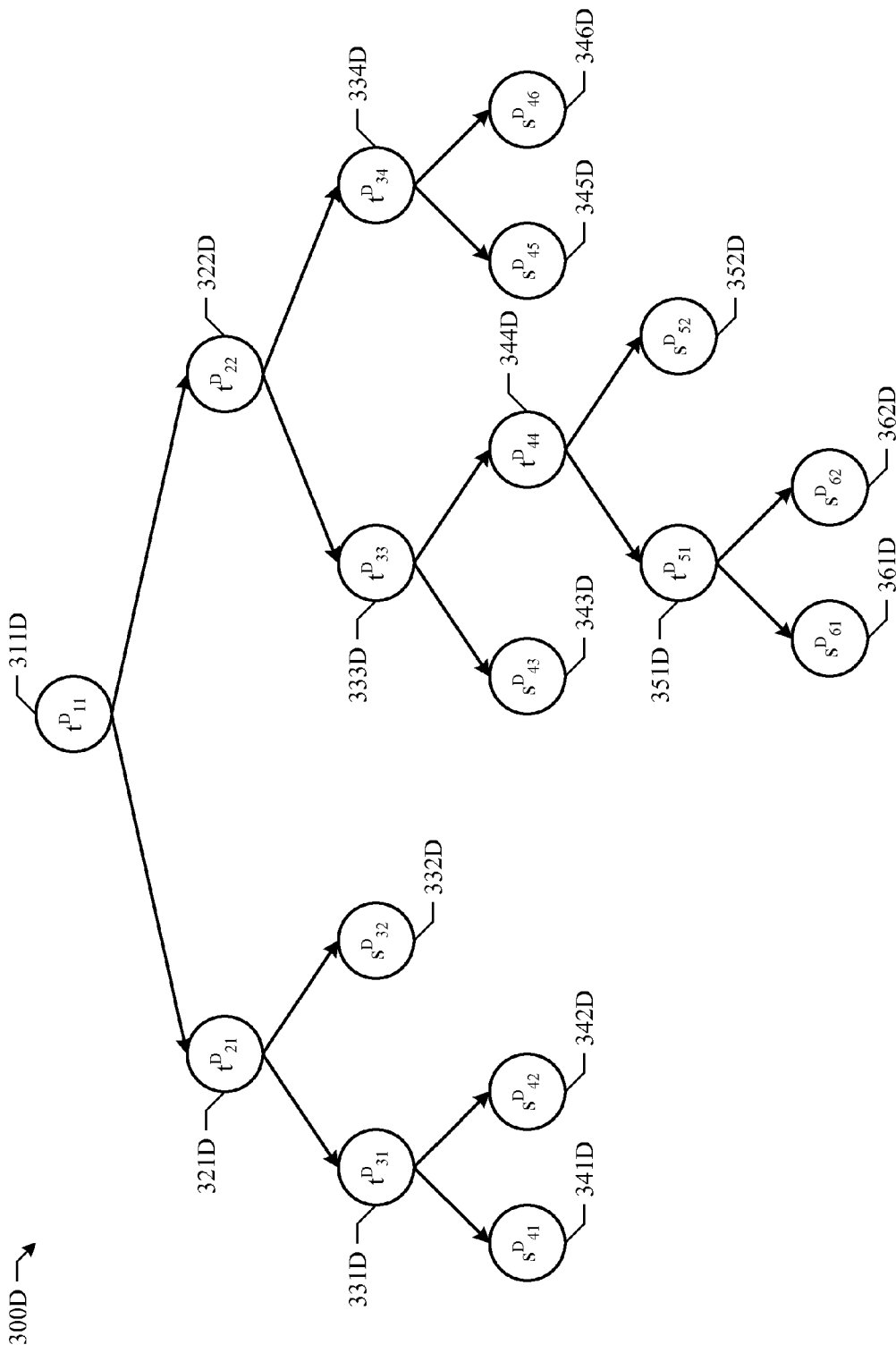
Figure 3E:
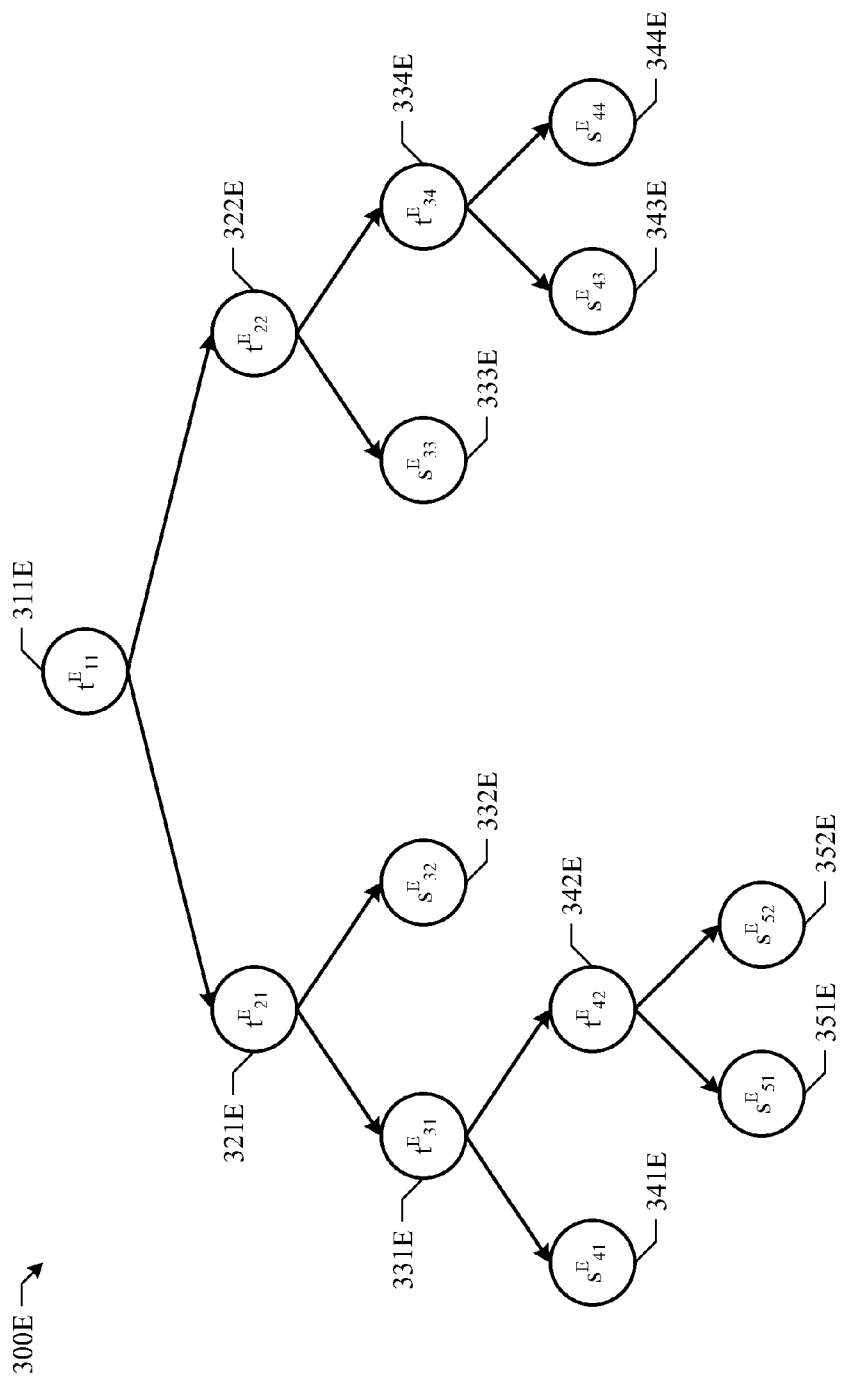
Figure 3F:
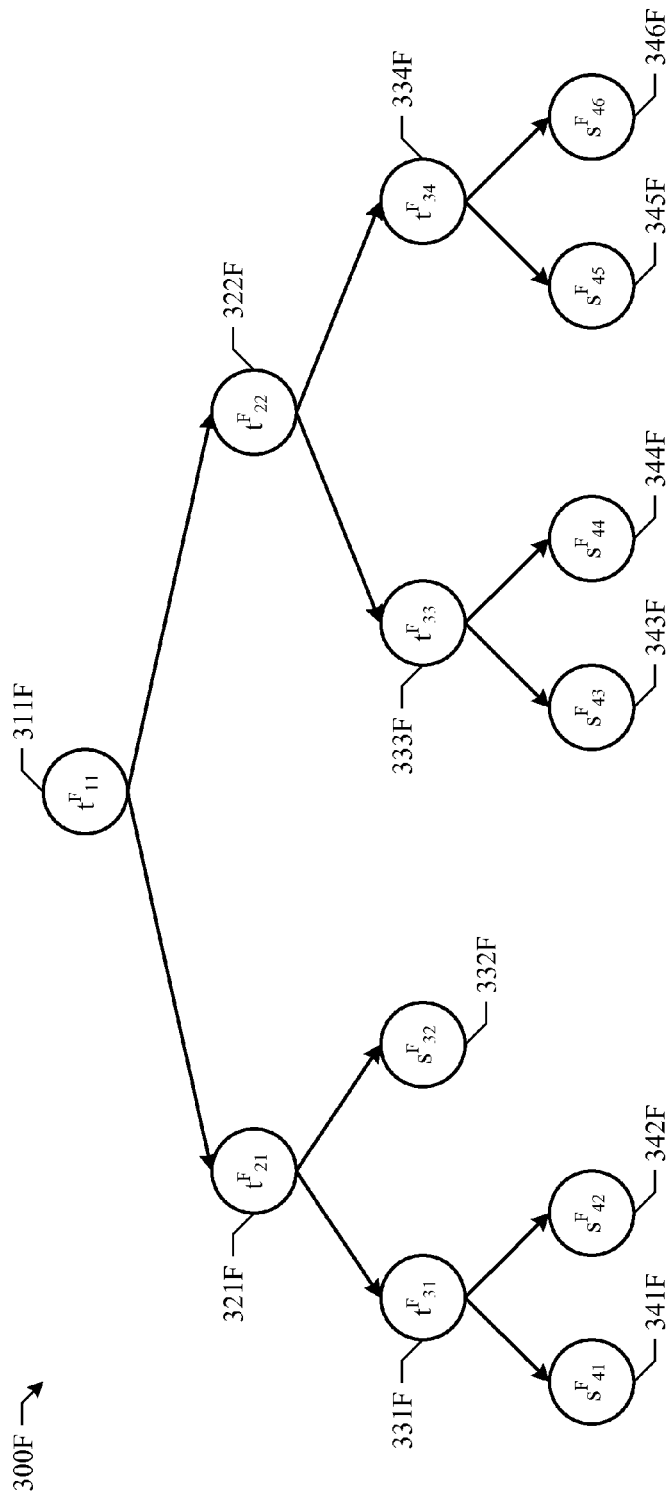

FIG. 3A illustrates an example binary decision tree 300A used to represent the threshold conditions of five network content features: $f^A_{11}$, $f^A_{21}$, $f^A_{22}$, $f^A_{33}$, and $f^A_{42}$. More specifically, root node 311A represents threshold condition $t^A_{11}$ of feature $f^A_{11}$; intermediate node 321A represents threshold condition $t^A_{21}$ of feature $f^A_{21}$; intermediate node 322A represents threshold condition $t^A_{22}$ of feature $f^A_{22}$; intermediate node 333A represents threshold condition $t^A_{33}$ of feature $f^A_{33}$; and intermediate node 342A represents threshold condition $t^A_{42}$ of feature $f^A_{42}$.

The threshold condition of a particular network content feature may be determined based on the nature of the network content feature. For example, if feature $f^A_{11}$ is the last time a network content has been modified, threshold condition $t^A_{11}$ may be less than or equal to one week. A network content that has been modified within one week, i.e., having a last-modified time less than or equal to one week, satisfies threshold condition $t^A_{11}$. Conversely, a network content that has been modified more than one week ago, i.e., having a last-modified time greater than one week, does not satisfy threshold condition $t^A_{11}$. If feature $f^A_{21}$ is the size of a network content, threshold condition $t^A_{21}$ may be greater than or equal to ten megabytes. A network content that has a size greater than or equal to ten megabytes satisfies threshold condition $t^A_{21}$. Conversely, a network content that has a size less than ten megabytes does not satisfy threshold condition $t^A_{21}$. And so on.

Suppose when traversing binary decision tree 300A, for each of root node 311A and intermediate nodes 321A, 322A, 333A, and 342A, if the threshold condition represented by the node is satisfied, the tree traversal proceeds to the left child node of the node and if the condition represented by the node is not satisfied, the tree traversal proceeds to the right child node of the node. Traversing binary decision tree 300A starting at root node 311A eventually leads to one of the scores represented by a particular one of leaf nodes 331A, 332A, 334A, 341A, 351A, and 352A.

Particular embodiments use the set of binary decision trees to determine a ranking score for each of the network contents identified in response to the search query. FIGS. 3B-3F illustrates five additional binary decision trees 300B-300F used to represent the threshold conditions of other possible network content features, similar to binary decision tree 300A. Note that only six binary decision trees are illustrated in order to simplify the discussion. In practice, there is no limit on the number of binary decision trees that may be used to represent threshold conditions of the network content features. In fact, due to the large number of the possible network content features, there may be a very large number of such binary decision trees used to determine the ranking score for each of the network contents identified in response to each search query, and each binary decision tree may have on average many leaf nodes and several levels. The binary decision trees, e.g. binary decision trees 300A-300F, may vary in the number of nodes and levels they have. They may also vary in the topologies of the nodes, e.g., some binary decision trees may be relatively balanced while others may not.

The binary decision trees and more specifically, the network content features, the threshold conditions of the individual features, and the scores represented by the nodes of the binary decision trees may be determined based on various factors, including, without limitation, human judgment, experimental data, empirical data, network traffic information, and other suitable information.

In particular embodiments, to determine a ranking score for a particular network content, each of the binary decision trees is traversed so that the network content is compared individually against the threshold conditions of the network content features represented by the non-leaf nodes. Depending on whether the network content has a feature that satisfies a particular threshold condition, the tree traversal proceeds to the left or the right child node, until a leaf node is reached. The scores of the leaf nodes reached as a result of traversing all of the binary decision trees are summed up as the ranking score of the network content.

Using binary decision tree 300A as an example, at root node 311A, if a network content has a feature that satisfies threshold condition $t^A_{11}$ (e.g., the network content has been modified with one week), the tree traversal proceeds to intermediate node 321A. At intermediate node 321A, if the network content does not have a feature that satisfies threshold condition $t^A_{21}$ (e.g., the network content has a size less than ten megabytes), the tree traversal proceeds to leaf node 332A. At this point, the tree traversal has reached a leaf node and so ends. Thus, traversing binary decision tree 300A with the network content results in score $s^A_{32}$, which is represented by leaf node 332A. In particular embodiments, if the network content does not have a particular feature corresponding to a threshold condition represented by a non-leaf node, the network content is considered not satisfying that threshold condition. Binary decision trees 300B-300F may be similarly traversed with the network content to obtain five addition scores, one of each of binary decision trees 300B-300F.

Suppose traversing binary decision tree 300B with the network content results in score $s^B_{41}$; traversing binary decision tree 300C with the network content results in score $s^C_{22}$; traversing binary decision tree 300D with the network content results in score $s^D_{52}$; traversing binary decision tree 300E with the network content results in score $s^E_{33}$; and traversing binary decision tree 300F with the network content results in score $s^F_{44}$. The ranking score of the network content may then be the sum of the six individual scores: $s^A_{32}+s^B_{41}+s^C_{22}+s^D_{52}+s^E_{33}+s^F_{44}$.

In practice, a few hundred to a few thousand individual network contents may be identified in response to each search query. There may be a few thousand binary decision trees used to rank the network contents. This means a few thousand tree traversals may need to be performed for each of the network contents. Consequently, a few million tree traversals may need to be performed in order to rank the network contents identified in response to a single search query. A search engine may receive hundreds or thousands of search queries every minute. Needless to say, tree traversals for ranking the network contents may consume a large amount of computer resources.

To improve the traversal of the binary decision trees, particular embodiments traverse multiple binary decision trees concurrently. Starting at the first level of the binary decision trees, all the nodes of all the binary decision trees at a particular level are evaluated, e.g., with respect to a network content, until all the nodes at that level have been evaluated. Furthermore, multiple nodes are evaluated concurrently. At any particular level, if a binary decision tree has reached one of its leaf nodes, that binary decision tree is removed from further evaluation for all subsequent levels. The leaf nodes reached may also be recorded for further processing. For example, in the case of determining ranking scores for a network content, the score represented by the leaf node is recorded or added to the ranking score of the network content. The evaluation is performed one level at a time until all of the binary decision trees have reached one of their leaf nodes, i.e., until all of the binary decision trees have been traversed from their root nodes to one of their leaf nodes.

Figure 4:
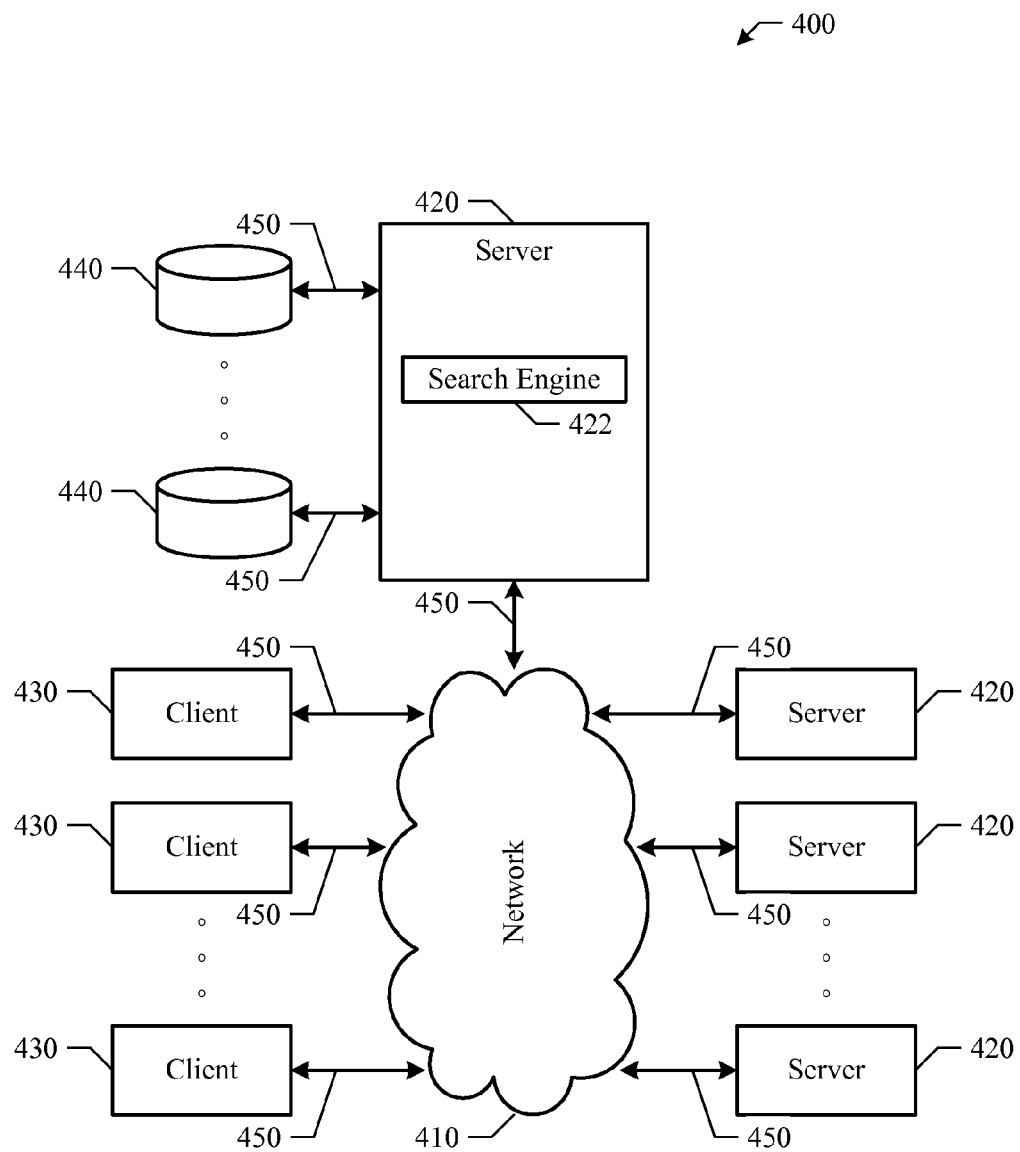
FIG. 4 illustrates an example network environment.

Particular embodiments may be implemented in a network environment. FIG. 4 illustrates an example network environment 400. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 410 or a combination of two or more such networks 410. The present disclosure contemplates any suitable network 410.

One or more links 450 couple servers 420 or clients 430 to network 410. In particular embodiments, one or more links 450 each includes one or more wired, wireless, or optical links 450. In particular embodiments, one or more links 450 each includes an intranet, an extranet, a VPN, a LAN, a WLAN, a WAN, a MAN, a communications network, a satellite network, a portion of the Internet, or another link 450 or a combination of two or more such links 450. The present disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. A client 430 may enable an network user at client 430 to access network 410. A client 430 may have a web browser, such as Microsoft Internet Explorer or Mozilla Firefox, and may have one or more add-ons, plug-ins, or other extensions, such as Google Toolbar or Yahoo Toolbar. A client 430 may enable its user to communicate with other users at other clients 430. The present disclosure contemplates any suitable clients 430.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. Particular embodiments may provide interfaces that enable servers 420 or clients 430 to manage, e.g., retrieve, modify, add, or delete, the information stored in data storage 440. In particular embodiments, the binary decision trees may be stored in one or more data storages 440.

In particular embodiments, a server 420 may include a search engine 422. Search engine 422 may include hardware, software, or embedded logic components or a combination of two or more such components for carrying out the appropriate functionalities implemented or supported by search engine 422. For example and without limitation, search engine 422 may implement one or more search algorithms that may be used to identify network contents in response to the search queries received at search engine 422, one or more ranking algorithms that may be used to rank the identified network contents, one or more summarization algorithms that may be used to summarize the identified network contents, and so on. In particular embodiments, the ranking algorithms implemented by search engine 422 may incorporate concurrently traversing multiple binary decision trees to calculate ranking scores for the network contents identified by search engine 422 in response to search queries received at search engine 422.

Figure 5:
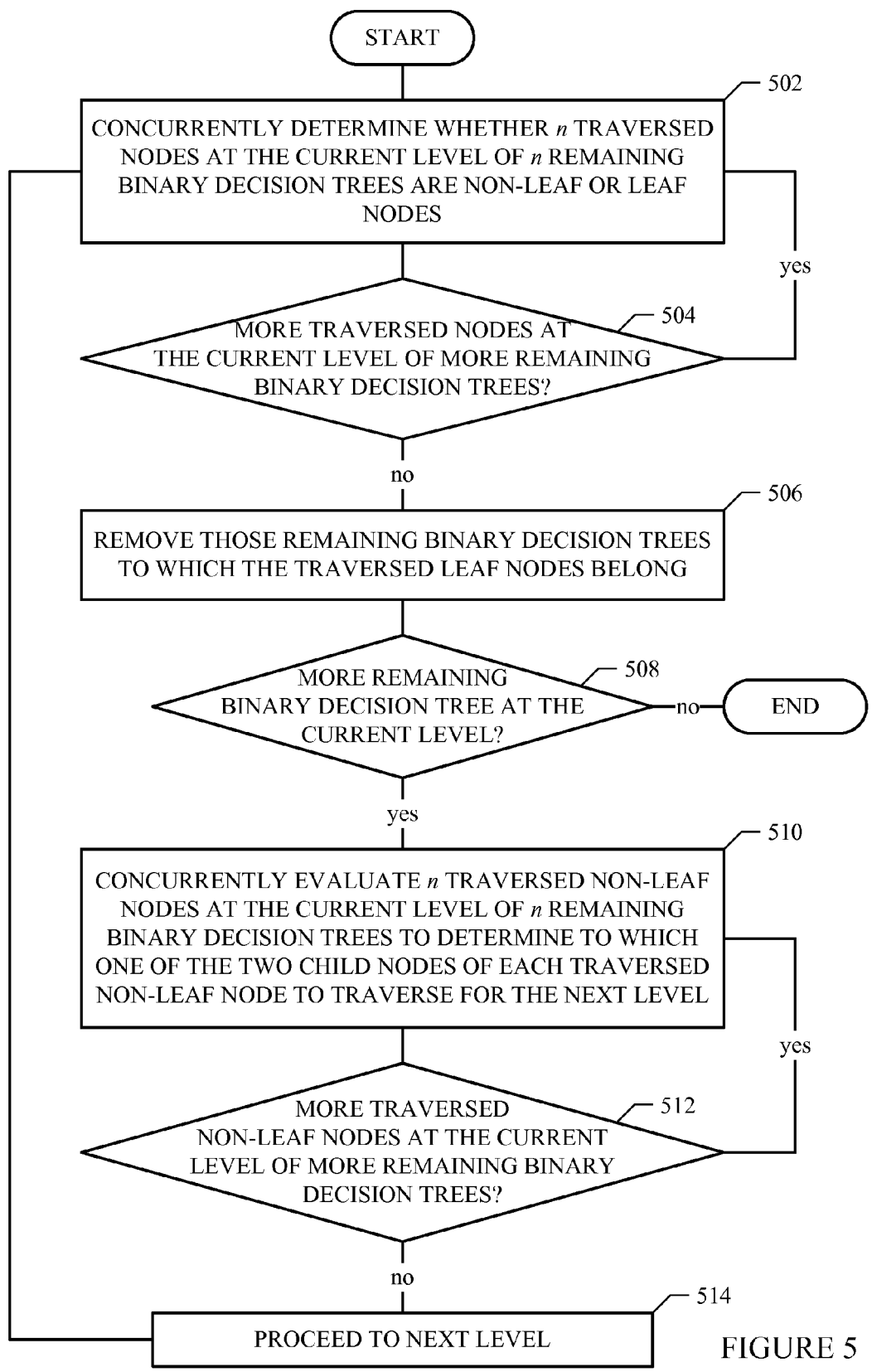
FIG. 5 illustrates an example method of concurrently traversing multiple binary decision trees.

FIG. 5 illustrates an example method of concurrently traversing multiple binary decision trees. Although selected steps in FIG. 5 may be described with reference to the ranking applications in the field of network search, the tree traversal process illustrated in FIG. 5 may be applied to any suitable fields and implemented for any suitable applications. In addition, to simplify the discussion, the steps in FIG. 5 are described using the six binary decision trees 300A-300F as an example. However, the same tree traversal process may be applied to any number of binary decision trees having any topologies.

Tree traversal generally begins at the first level, i.e., the root level, of the binary decision trees and proceeds one level at a time until one of the leaf nodes of each of the binary decision trees is reached. In particular embodiments, the traversed nodes of all of the binary decision trees are processed one level at a time, until all of the binary decision trees have each reached one of their leaf nodes. Particular embodiments implement an iterative algorithm such that each iteration processes the traversed nodes at a particular level of the binary decision trees. Hereafter, the level of the binary decision trees that is being processed during the current iteration is referred to as the "current level". Thus, during the first iteration, the current level is the first level, i.e., the root level, of the binary decision trees; during the second iteration, the current level is the second level of the binary decision trees; and so on.

In particular embodiments, the traversed nodes at each level of the binary decision trees are the nodes visited during the tree traversal of the binary decision trees at that level. Since the tree traversal generally begins with the root nodes of the binary decision trees, at the root level, the traversed nodes are the root nodes of the binary decision trees. In binary decision trees 300A-300F, the root nodes are 311A-311F, which are the traversed nodes of binary decision trees 300A-300F at the root level, i.e., the first level. At each non-root level, the traversed nodes are determined as a result of evaluating their parent nodes at the previous level.

In particular embodiments, the remaining binary decision trees at each level of the binary decision trees are those binary decision trees that have not yet reached one of their leaf nodes at that level. In other words, the tree traversal has not ended for the remaining binary decision trees at a particular level. Consequently, at the root level, i.e., the first level, all of the binary decision trees are considered as the remaining binary decision trees, since none of the binary decision trees has reached one of its leaf nodes yet. For example, at the first level, all six binary decision trees 300A-300F are considered as the remaining binary decision trees.

During each iteration, particular embodiments concurrently determine whether n traversed nodes at the current level of n remaining binary decision trees are non-leaf nodes or leaf nodes, as illustrated in step 502. In particular embodiments, n is an integer greater than or equal to 2. In particular embodiments, n is a power of 2, such as, 2, 4, 8, 16, and so on. To simplify the discussion, the steps in FIG. 5 are described using n=4 as an example. However, the same tree traversal process may be applied where n is any integer greater than or equal to 2. In particular embodiments, each n traversed nodes are processed, e.g., tested for leaf nodes, evaluated for branching, etc., in a single operation.

After processing each n traversed nodes, particular embodiments determines whether there are more traversed nodes at the current level to be processed, as illustrated in step 504. If there are more traversed nodes to be processed (step 504, "yes"), particular embodiments concurrently determine whether the next n traversed nodes are non-leaf nodes or leaf nodes. Particular embodiments concurrently process n traversed nodes at a time until all of the traversed nodes at the current level from all of the remaining binary decision trees have been processed.

For example, at the first level, there are six traversed nodes, i.e., six root nodes, 311A, 311B, 311C, 311D, 311E, and 311F, from binary decision trees 300A-300F. The first four traversed nodes, root nodes 311A, 311B, 311C, and 311D, are processed concurrently to determine whether these four traversed nodes are non-leaf nodes or leaf nodes. The next two traversed nodes, root nodes 311E and 311F, are then processed concurrently to determine whether these two traversed nodes are non-leaf nodes or leaf nodes. At this point, all six traversed nodes at the first level have been processed.

Sometimes, the last group of the traversed nodes to be processed at a particular level may not have exactly n, e.g., 4, traversed nodes left, as in the example with nodes 311E and 311F. Particular embodiments may pad the last group of the traversed nodes when needed so that there are exactly n traversed nodes to be processed concurrently in the last group. The padding nodes may take any form that is suitable for the specific applications implementing the tree traversal. For example, for the application of calculating ranking scores using the binary decision trees, the padding nodes may be leaf nodes each representing a score of 0.

After all of the traversed nodes at the current level of all of the remaining binary decision trees have been processed (step 504, "no"), in particular embodiments, for those traversed nodes at the current level that are determined to be leaf nodes, the binary decision trees to which the traversed leaf nodes belong are removed from the remaining binary decision trees, as illustrated in step 506. These binary decision trees have each reached one of their leaf nodes, and thus, the tree traversal has ended for these binary decision trees. If none of the traversed nodes at the current level is a leaf node, then no binary decision tree is removed from the remaining binary decision trees. For example, at the first level, node 311A, 311B, 311C, 311D, 311E, and 311F are all non-leaf nodes, and thus all six binary decision trees 300A-300F remain.

Since there are only root nodes at the first level, particular embodiments may further optimize the tree traversal by not testing for non-leaf nodes at the first level, i.e., omitting steps 502, 504, and 506 for the first level.

Particular embodiments determine whether any binary decision tree still remains at the current level, as illustrated in step 508. If there is no remaining binary decision tree at the current level, then all of the binary decision trees have reached one of their leaf nodes (step 508, "no"). In this case, the tree traversal ends for all of the binary decision trees. On the other hand, if there is any remaining binary decision tree left (step 508, "yes"), then at least one of the binary decision tree has not yet reached one of its leaf nodes, which means the tree traversal still needs to continue for one or more iterations.

particular embodiments concurrently evaluates n, e.g., 4, traversed nodes at the current level of n, e.g., 4, remaining binary decision trees to determine to which one of the two child nodes of each non-leaf node to traverse for the next level, as illustrated in step 510. In particular embodiments, each n traversed nodes are evaluated in a single operation.

In a binary decision tree, each non-leaf node represents a condition. During the tree traversal, at each traversed non-leaf node, whether to traverse to its left or right child node for the next level depends on whether the condition represented by the traversed non-leaf node at the current level is satisfied. The conditions represented by the non-leaf nodes may vary depending on the specific applications implementing the tree traversal. For example, for the application of calculating ranking scores using the binary decision trees, each non-leaf nodes may represent a feature threshold condition for a network content feature. In this case, evaluating a non-leaf node to determine to which of its two child nodes to traverse for the next level is based on whether a network content has a feature that satisfy the feature threshold condition represented by the non-leaf node for that feature.

Consider a particular network content. For binary decision tree 300A, at node 311A, if the network content has network content feature $f_{11}$ that satisfies threshold condition $t^A{}_{11}$, then the tree traversal for binary decision tree 300A should proceed to node 321A for the next level. For binary decision tree 300B, at node 311B, if the network content has network content feature $f^B{}_{11}$ that satisfies threshold condition $t^B{}_{11}$, then the tree traversal for binary decision tree 300B should proceed to node 321B for the next level. For binary decision tree 300C, at node 311C, if the network content does not have network content feature $f^C{}_{11}$ or its network content feature $f^C{}_{11}$ does not satisfy threshold condition $t^C{}_{11}$, then the tree traversal for binary decision tree 300C should proceed to node 322C for the next level. For binary decision tree 300D, at node 311D, if the network content does not have network content feature $f^D{}_{11}$ or its network content feature $f^D{}_{11}$ does not satisfy threshold condition $t^D{}_{11}$, then the tree traversal for binary decision tree 300D should proceed to node 322D for the next level. For binary decision tree 300E, at node 311E, if the network content does not have network content feature $f^E{}_{11}$ or its network content feature $f^E{}_{11}$ does not satisfy threshold condition $t^E{}_{11}$, then the tree traversal for binary decision tree 300E should proceed to node 322E for the next level. For binary decision tree 300F, at node 311F, if the network content does not have network content feature $f^F{}_{11}$ or its network content feature $f^F{}_{11}$ does not satisfy threshold condition $t^F{}_{11}$, then the tree traversal for binary decision tree 300F should proceed to node 322F for the next level.

After evaluating each n, e.g., 4, traversed non-leaf nodes, particular embodiments determines whether there are more traversed non-leaf nodes at the current level to be evaluated, as illustrated in step 512. If there are more traversed non-leaf nodes to be evaluated (step 512, "yes"), particular embodiments concurrently evaluate the next n, e.g., 4, traversed non-leaf nodes to determine to which one of the two child nodes of each traversed non-leaf node to traverse for the next level. Particular embodiments concurrently evaluate n, e.g., 4, traversed non-leaf nodes at a time until all of the traversed non-leaf nodes at the current level from all of the remaining binary decision trees have been processed.

For example, for the six traversed nodes, i.e., root nodes, at the first level in binary decision trees 300A-300F, the first four traversed nodes, nodes 311A, 311B, 311C, and 311D, are evaluated concurrently to determine to which one of the two child nodes of each of nodes 311A, 311B, 311C, and 311D to traverse for the next level. The next 2 traversed nodes, nodes 311E and 311F, are then evaluated concurrently to determine to which one of the two child nodes of each of nodes 311E and 311F to traverse for the next level. At this point, all six traversed nodes at the first level have been evaluated.

Again, sometimes, the last group of traversed nodes to be processed may not have exactly n, e.g., 4, traversed nodes left, as in the example with nodes 311E and 311F. Particular embodiments may pad the last group of traversed nodes when needed so that there are exactly four traversed nodes to be processed concurrently. The padding nodes may take any form that is suitable for the specific applications implementing the tree traversal. For example, for the application of calculating ranking scores using the binary decision trees, the padding nodes may be leaf nodes each representing a score of 0.

During each iteration, particular embodiments may further optimize the tree traversal by pre-fetching the traversed nodes at the current level into cache memory. For example, at the first level, the six root nodes, 311A, 311B, 311C, 311D, 311E, and 311F, are divided into two groups, the first group including root nodes 311A, 311B, 311C, and 311D, and the second group include root nodes 311E and 311F. While evaluating the second group, the traversed nodes of the next level, i.e., the second level, for the binary decision trees to which the root nodes in the first group belong, i.e., binary decision trees 300A, 300B, 300C, and 300D, may be pre-fetched into cache memory, since the traversed nodes at the next level for these four binary decision trees are now known. Thus, while evaluating root nodes 311E and 311F, traversed nodes 321A, 321B, 322C, and 322D may be pre-fetched into cache memory.

Once all of the traversed non-leaf nodes of the remaining binary decision trees have been evaluated, particular embodiments proceed to the next level to begin another iteration, as illustrated in 514. During the next iteration, the next level becomes the current level.

For example, during the second iteration, the second level becomes the current level. The traversed nodes at the second level result from evaluating their respective parent nodes during the previous iteration at the first level. In binary decision trees 300A-300F, the traversed nodes at the second level are nodes 321A, 321B, 322C, 322D, 322E, and 322F. It is possible that these traversed nodes may be intermediate nodes or leaf nodes. Thus, particular embodiments determine whether each of the traversed nodes at the current level is an intermediate node or a leaf node (step 502).

As before, particular embodiments may concurrently determine four traversed nodes at a time. First, nodes 321A, 321B, 322C, and 322D are tested concurrently. In this example, nodes 321A, 321B, and 322D are intermediate nodes, while node 322C is a leaf node. When tree traversal of a binary decision tree has reached one of the tree's leaf nodes, the tree traversal ends. For binary decision tree 300C, the tree traversal ends during this iteration as the tree traversal has reached leaf node 322C. Particular embodiments record leaf node 322C for binary decision tree 300C as the result of traversing binary decision tree 300C and removes binary decision tree 300C from further evaluation during all subsequent levels (step 506) as there is no more level in binary decision tree 300C to traverse further down. The leaf node 332C may be further processed as needed. For example, the score represented by traversed leaf node 322C, i.e., score $s^c{}_{22}$, may be added to the ranking score for the network content.

Next, there are two more nodes, nodes 322E and 322F, still need to be tested (step 504, "yes"). Thus, particular embodiments may concurrently determine whether each of nodes 322E and 322F is an intermediate node or a leaf node. Again, since there are only two nodes left, particular embodiments may pad two more nodes as described above so that there are four nodes to be tested concurrently. Both 322E and 322F are intermediate nodes, which indicate that the tree traversal for binary decision trees 300E and 300F have not ended.

For the five traversed intermediate nodes at the current level, nodes 321A, 321B, 322D, 322E, and 322F, particular embodiments evaluate these nodes to determine that for each of the intermediate nodes, to which one of its two child nodes to traverse at the next level (step 510). Particular embodiments evaluate four intermediate nodes concurrently. First, nodes 321A, 321B, 322D, and 322E are evaluated concurrently. For example, the network content is compared against nodes 321A, 321B, 322D, and 322E to determine whether the network content has specific features that satisfy the four feature threshold requirements represented by nodes 321A, 321B, 322D, and 322E respectively. Suppose for node 321A, the network content does not have a feature that satisfies the feature threshold $t^A{}_{21}$ represented by node 321A, then for the next level, i.e., the third level, the tree traversal of binary decision tree 300B proceeds to node 332A, the right child node of node 321A. For node 321B, the network content has a feature that satisfies the feature threshold $t^B_{21}$ represented by node 321B, then for the third level, the tree traversal of binary decision tree 300B proceeds to node 331B, the left child node of node 321B. Similarly, suppose for the third level, the tree traversal of binary decision tree 300D proceeds to node 333D, the left child node of node 322D, and the tree traversal of binary decision tree 300E proceeds to node 333E, the left child node of node 322E.

There is still one traversed node, node 322F, left at the current level that has not been evaluated (step 512, "no"). Thus, particular embodiments evaluate the remaining node 322F (step 510). Again, three padding nodes may be added to node 322F as described above so that four nodes may be concurrently evaluated. Suppose for the third level, the tree traversal of binary decision tree 300F proceeds to node 333F, the left child node of node 322F.

Again, while evaluating node 322F, traversed nodes at the next level, i.e., the third level, for binary decision trees 300A, 300B, 300D, and 300E may be pre-fetched into cache memory in preparation for the next iteration. Specifically, traversed nodes 332A, 331B, 333D, and 333E may be pre-fetched into cache memory while evaluating node 332F. In general, particular embodiments may pre-fetch the traversed nodes at the next level determined from evaluating each group of traversed nodes at the current level after that group of traversed nodes at the current level has been evaluated.

At this point, all traversed intermediate nodes at the current level have been evaluated (step 512, "no"), the tree traversal may now proceed to the next level, i.e., the third level (step 514).

The same steps are repeated for the third level, i.e., first determining whether the traversed nodes are, and then removing the binary decision trees to which the leaf nodes belong from further evaluation and evaluating the intermediate nodes for further branching.

At the third level, there are five traversed nodes, nodes 332A, 331B, 333D, 333E, and 333F. Nodes 332A, 331B, 333D, and 333E are concurrently tested to determine whether they are intermediate nodes or leaf nodes, followed by node 333F with three optional padding nodes (step 502). Among the five traversed nodes at the third level, 332A and 333E are leaf nodes, which means the tree traversal for binary decision trees 300A and 300E has completed. Particular embodiments may remove binary decision trees 300A and 300E from further evaluation and add the scores represented by leaf nodes 332A and 333E, i.e., scores $s^A_{32}$ and $s^E_{33}$, to the ranking score of the network content.

Traversed nodes 331B, 333D, and 333F are intermediate nodes. Thus, particular embodiments concurrently evaluate nodes 331B, 333D, and 333F with an optional padding node to determine, for each of traversed intermediate 331B, 333D, and 333F, to which of its two child nodes to traverse at the next level, i.e., the fourth level (step 510). Suppose for binary decision tree 300B, the tree traversal proceeds to node 341B from node 331B based on comparing the features of the network content with the feature threshold requirement represented by node 331B, i.e., $t^B_{31}$; for binary decision tree 300D, the tree traversal proceeds to node 333D from node 344D based on comparing the features of the network content with the feature threshold requirement represented by node 333D, i.e., $t^D_{33}$; and for binary decision tree 300F, the tree traversal proceeds to node 344F from node 333F based on comparing the features of the network content with the feature threshold requirement represented by node 333F, i.e., $t^F_{33}$.

As the tree traversal proceeds down the levels, more and more binary decision trees reach one of their leaf nodes. Consequently, less and less binary decision trees still have traversed nodes at the current level to be tested and evaluated. For example, at the fourth level, only binary decision trees 300B, 300D, and 300F still remain, that is, having traversed nodes to be tested and evaluated. Traversed nodes 341B from binary decision tree 300B and nodes 344F from binary decision tree 300F are both leaf nodes. The scores represented by traversed leaf nodes 341B and 344F, i.e., scores $s^B_{41}$ and $s^F_{44}$, may be added to the ranking score of the network content, and binary decision trees 300B and 300F may be removed from further consideration for subsequent levels since they have reached their leaf nodes (step 506). Traversed intermediate node 344D from binary decision tree 300D may be evaluated to determined to which of its two child nodes to traverse at the next level, i.e., the fifth level. Suppose the tree traversal of binary decision tree 300D proceeds to node 352D from node 344D.

At the fifth level, binary decision tree 300D is the only binary decision tree remaining that still has a traversed node at this level. Traversed node 352D is a leaf node. Thus, binary decision tree 300D has reached one of its leaf nodes as well. The score represented by traversed leaf 352D, i.e., score $s^D_{52}$, may be added to the ranking score of the network content, and binary decision tree 300D may be removed from further consideration for subsequent levels.

At the fifth level, all of the binary decision trees have reached one of their leaf nodes. The tree traversal may end. The ranking score for the network content are the sum of the scores represented by nodes 332A, 341B, 322C, 352D, 333E, and 344F, which equals $s^A_{32}+s^B_{41}+s^C_{22}+s^D_{52}+s^E_{33}+s^F_{44}$.

At each level, particular embodiments perform operations for each n, e.g., 4, traversed nodes concurrently. For examples, n traversed nodes may be concurrently tested for leaf nodes, evaluated for threshold satisfaction, or branched and n scores represented by n leaf nodes may be concurrently added. Particular embodiments use single instruction, multiple data (SIMD) instructions. For example, in the case when n is 4, four pieces of data, e.g., four pointers to four memory locations that are used to store four nodes, four threshold values, four feature parameters of the network content, four scores represented by four leaf nodes, pre-fetching of four traversed node into cache memory, etc., are stored in a single register or single variable so that four pieces of data may be processed concurrently using one instruction or one operation. For example, a vector compare instruction may be used to evaluate four nodes.

Particular embodiments may represent each binary decision tree in specific data structures. For example, particular embodiments may arrange to have the two child nodes of a node stored together in memory, such that the left child node proceeds the right child node. The two memory locations may be referenced using two pointers, where the pointer to the memory location of the right child node is the pointer to the memory location of the left child node plus 1.

For the evaluation of the traversed intermediate nodes, for each intermediate node, if the left child node is to be traversed to at the next level, a result value of hexadecimal 0x00000000 is stored for the intermediate node. If the right node is to be traversed to, a result value of hexadecimal 0xFFFFFFFF is stored for the intermediate node, which represents a −1 as a signed integer. For the branching operating of each of the intermediate nodes, the result value determined for the intermediate node is subtracted from the pointer to the left child node of the intermediate node, and since subtracting a −1 is mathematically equivalent to adding a 1, the subtraction operation results in the pointer of the one of the two child nodes to which the tree traversal should branch to. This calculation replaces the use of a computationally expensive branch operation common in tree traversal.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 6:
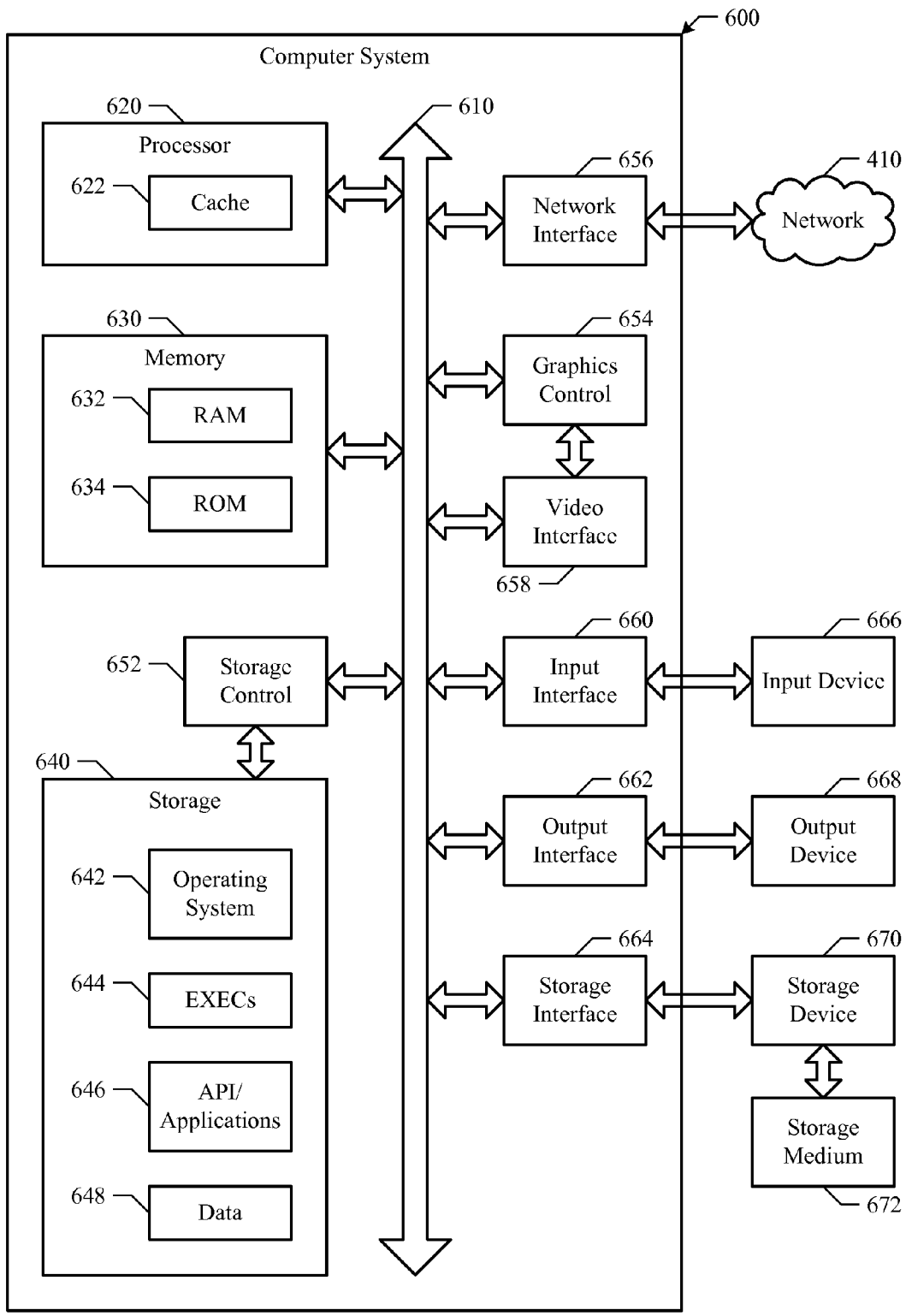
FIG. 6 illustrates an example computer system.

For example, FIG. 6 illustrates an example computer system 600 suitable for implementing one or more portions of particular embodiments. Although the present disclosure describes and illustrates a particular computer system 600 having particular components in a particular configuration, the present disclosure contemplates any suitable computer system having any suitable components in any suitable configuration. Moreover, computer system 600 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 610 couples subsystems of computer system 600 to each other. Herein, reference to a bus encompasses one or more digital signal lines serving a common function. The present disclosure contemplates any suitable system bus 610 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 600 includes one or more processors 620 (or central processing units (CPUs)). A processor 620 may contain a cache 622 for temporary local storage of instructions, data, or computer addresses. Processors 620 are coupled to one or more storage devices, including memory 630. Memory 630 may include random access memory (RAM) 632 and read-only memory (ROM) 634. Data and instructions may transfer bidirectionally between processors 620 and RAM 632. Data and instructions may transfer unidirectionally to processors 620 from ROM 634. RAM 632 and ROM 634 may include any suitable computer-readable storage media.

Computer system 600 includes fixed storage 640 coupled bi-directionally to processors 620. Fixed storage 640 may be coupled to processors 620 via storage control unit 652. Fixed storage 640 may provide additional data storage capacity and may include any suitable computer-readable storage media. Fixed storage 640 may store an operating system (OS) 642, one or more executables 644, one or more applications or programs 646, data 648, and the like. Fixed storage 640 is typically a secondary storage medium (such as a hard disk) that is slower than primary storage. In appropriate cases, the information stored by fixed storage 640 may be incorporated as virtual memory into memory 630.

Processors 620 may be coupled to a variety of interfaces, such as, for example, graphics control 654, video interface 658, input interface 660, output interface 662, and storage interface 664, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 656 may couple processors 620 to another computer system or to network 410. With network interface 656, processors 620 may receive or send information from or to network 410 in the course of performing steps of particular embodiments. Particular embodiments may execute solely on processors 620. Particular embodiments may execute on processors 620 and on one or more remote processors operating together.

In a network environment, where computer system 600 is connected to network 410, computer system 600 may communicate with other devices connected to network 410. Computer system 600 may communicate with network 410 via network interface 656. For example, computer system 600 may receive information (such as a request or a response from another device) from network 410 in the form of one or more incoming packets at network interface 656 and memory 630 may store the incoming packets for subsequent processing. Computer system 600 may send information (such as a request or a response to another device) to network 410 in the form of one or more outgoing packets from network interface 656, which memory 630 may store prior to being sent. Processors 620 may access an incoming or outgoing packet in memory 630 to process it, according to particular needs.

Computer system 600 may have one or more input devices 666 (which may include a keypad, keyboard, mouse, stylus, etc.), one or more output devices 668 (which may include one or more displays, one or more speakers, one or more printers, etc.), one or more storage devices 670, and one or more storage medium 672. An input device 666 may be external or internal to computer system 600. An output device 668 may be external or internal to computer system 600. A storage device 670 may be external or internal to computer system 600. A storage medium 672 may be external or internal to computer system 600.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 630 may include one or more computer-readable storage media embodying software and computer system 600 may provide particular functionality described or illustrated herein as a result of processors 620 executing the software. Memory 630 may store and processors 620 may execute the software. Memory 630 may read the software from the computer-readable storage media in mass storage device 630 embodying the software or from one or more other sources via network interface 656. When executing the software, processors 620 may perform one or more steps of one or more processes described or illustrated herein, which may include defining one or more data structures for storage in memory 630 and modifying one or more of the data structures as directed by one or more portions the software, according to particular needs. In addition or as an alternative, computer system 600 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
 accessing, by one or more computer systems, m binary trees,
  m denoting an integer greater than or equal to 2,
  the m binary trees each comprising one or more non-leaf nodes, two or
 more leaf nodes, and one or more levels,
  the non-leaf nodes of each of the m binary trees comprising one root node
 and zero or more intermediate nodes,
  for each of the m binary trees, the non-leaf nodes each having two child nodes, the intermediate nodes and the leaf nodes each having one parent node, and the levels each comprising one or more of the non-leaf or leaf nodes; and
 sequentially processing, by the one or more computer systems, every one of the levels of the m binary trees until reaching a leaf node for each the m binary trees, processing each one of the levels of the m binary trees comprising:
  determining whether one or more traversed nodes of one or more remaining of the m binary trees at the level are each a non-leaf node or a leaf node,
   the remaining binary trees each having one of its non-leaf or leaf nodes at the level as one of the traversed nodes,
   the traversed nodes at the level each being the root node of one of the m binary trees or having been determined as a result of evaluating its parent node;
  for the traversed leaf nodes at the level, removing the binary trees to which the traversed leaf nodes belong from the remaining binary trees; and
  iteratively evaluating the traversed non-leaf nodes at the level of every n of the remaining binary trees until the non-leaf nodes at the level of all of the remaining binary trees are evaluated,
   n denoting an integer greater than or equal to 2,
   evaluating the traversed non-leaf nodes of each n binary trees comprising concurrently evaluating the n traversed non-leaf nodes of the n binary trees to determine to which one of the two child nodes of each of the n traversed non-leaf nodes to traverse.

2. The method of claim 1, wherein at each one of the levels of the m binary trees, determining whether the traversed nodes of the remaining binary trees are each a non-leaf node or a leaf node comprises:

iteratively determining the traversed nodes at the level of every n of the remaining binary trees until the traversed nodes at the level of all of the remaining binary trees are determined, determining the traversed nodes of each n binary trees comprising concurrently determining whether the n traversed nodes of the n binary trees are each an intermediate node or a leaf node.

3. The method of claim 1, wherein processing each one of the levels of the m binary trees further comprises:

iteratively traversing from the traversed non-leaf nodes at the level of every n of the remaining binary trees until the traversed non-leaf nodes at the level of all of the remaining binary trees are traversed, traversing from the traversed non-leaf nodes of each n binary trees comprising concurrently traversing from the n traversed non-leaf nodes of the n binary trees to the n child nodes of the n traversed non-leaf nodes respectively determined as a result of concurrently evaluating the n traversed non-leaf nodes.

4. The method of claim 1, wherein processing each one of the levels of the m binary trees further comprises padding one or more padding nodes to the traversed nodes at the level so that a total number of the traversed nodes and the padding nodes is divisible by n.

5. The method of claim 1, wherein processing each one of the levels of the m binary trees further comprises pre-fetching the traversed nodes at a next level.

6. The method of claim 1, wherein:

processing each one of the levels of the m binary trees further comprises recording the traversed leaf nodes at the level; and the method further comprises processing, by the one or more computer systems, the m traversed leaf nodes of the m binary trees.

7. The method of claim 1, wherein:

for each of the m binary trees, the non-leaf nodes each represents a feature threshold requirement for a network content feature, and the leaf nodes each represents a score, and at each one of the levels of the m binary trees, concurrently evaluating the n traversed non-leaf nodes of the n binary trees to determine to which one of the two child nodes of each of the n traversed non-leaf nodes to traverse comprises:

concurrently comparing one or more features of a network content to n feature threshold requirements represented by the n traversed non-leaf nodes, for each of the n traversed non-leaf nodes, selecting a first one of the two child nodes of the traversed non-leaf node to traverse to if the features of the network content satisfies the feature threshold requirement represented by the traversed non-leaf node, and selecting a second one of the two child nodes of the traversed non-leaf node to traverse to if the features of the network content does not satisfy the feature threshold requirement represented by the traversed non-leaf node.

8. The method of claim 7, further comprising:

summing, by the one or more computer systems, m scores represented by the m traversed leaf nodes of the m binary trees as a ranking score for the network content, comprising:

initializing the ranking score to 0; and iteratively adding every n of the m scores to the ranking score until all of the m scores are added, adding each n scores to the ranking score comprising concurrently adding the n scores to the ranking score.

9. A method comprising:

accessing, by one or more computer systems, m binary trees, m denoting an integer greater than or equal to 2, the m binary trees each comprising one root node, zero or more intermediate nodes, two or more leaf nodes, one root level, and one or more subsequent levels, and for each of the m binary trees, the root node and the intermediate nodes each having two child nodes, the intermediate nodes and the leaf nodes each having one parent node, the root level comprising the root node, and the subsequent levels each comprising one or more of the intermediate or leaf nodes;

processing, by the one or more computer systems, the root level of the m binary trees, comprising iteratively evaluating the root nodes of every n of the m binary trees until the root nodes of all of the m binary trees are evaluated, n denoting an integer greater than or equal to 2, evaluating the root nodes of each n binary trees comprising concurrently evaluating the n root nodes of the n binary trees to determine to which one of the two child nodes of each of the n root nodes to traverse; and sequentially processing, by the one or more computer systems, every one of the subsequent levels of the m binary trees until reaching a leaf node for each the m binary trees, processing each one of the subsequent levels of the m binary trees comprising:

determining whether one or more traversed nodes of one or more remaining of the m binary trees at the subsequent level are each an intermediate node or a leaf node, the remaining binary trees each having one of its intermediate or leaf nodes at the subsequent level as one of the traversed nodes, the traversed nodes at the subsequent level each having been determined as a result of evaluating its parent node;

for the traversed leaf nodes at the subsequent level, removing the binary trees to which the traversed leaf nodes belong from the remaining binary trees; and iteratively evaluating the traversed intermediate nodes at the subsequent level of every n of the remaining binary trees until the traversed intermediate nodes at the subsequent level of all of the remaining binary trees are evaluated, evaluating the traversed intermediate nodes of each n binary trees comprising concurrently evaluating the n traversed intermediate nodes of the n binary trees to determine to which one of the two child nodes of each of the n traversed intermediate nodes to traverse.

10. The method of claim 9, wherein at each one of the subsequent levels of the m binary trees, determining whether the traversed nodes of the remaining binary trees are each an intermediate node or a leaf node comprises:

iteratively determining the traversed nodes at the subsequent level of every n of the remaining binary trees until the traversed nodes at the subsequent level of all of the remaining binary trees are determined, determining the traversed nodes of each n binary trees comprising concurrently determining whether the n traversed nodes of the n binary trees are each an intermediate node or a leaf node.

11. The method of claim 9, wherein processing each one of the subsequent levels of the m binary trees further comprises:

iteratively traversing from the traversed intermediate nodes at the subsequent level of every n of the remaining binary trees until the traversed intermediate nodes at the subsequent level of all of the remaining binary trees are traversed, traversing from the traversed intermediate nodes of each n binary trees comprising concurrently traversing from the n traversed intermediate nodes of the n binary trees to the n child nodes of the n traversed intermediate nodes respectively determined as a result of concurrently evaluating the n traversed intermediate nodes.

12. The method of claim 9, wherein:

processing the root level of the m binary trees further comprises padding one or more padding nodes to the root nodes at the root level so that a total number of the root nodes and the padding nodes is divisible by n, and processing each one of the subsequent levels of the m binary trees further comprises padding one or more padding nodes to the traversed nodes at the subsequent level so that a total number of the traversed nodes and the padding nodes is divisible by n.

13. The method of claim 9, wherein processing each one of the subsequent levels of the m binary trees further comprises pre-fetching the traversed nodes at a next subsequent level.

14. The method of claim 9, wherein:

processing each one of the subsequent levels of the m binary trees further comprises recording the traversed leaf nodes at the subsequent level; and the method further comprises processing, by the one or more computer systems, the m traversed leaf nodes of the m binary trees.

15. The method of claim 9, wherein:

for each of the m binary trees, the root node and the intermediate nodes each represents a feature threshold requirement for a network content feature, and the leaf nodes each represents a score, at the root level of the m binary trees, concurrently evaluating the n root nodes of the n binary trees to determine to which one of the two child nodes of each of the n root nodes to traverse comprises:

concurrently comparing one or more features of a network content to n feature threshold requirements represented by the n root nodes, for each of the n root nodes, selecting a first one of the two child nodes of the root node to traverse to if the features of the network content satisfies the feature threshold requirement represented by the root node, and selecting a second one of the two child nodes of the root node to traverse to if the features of the network content does not satisfy the feature threshold requirement represented by the root node, and at each one of the subsequent levels of the m binary trees, concurrently evaluating the n traversed intermediate nodes of the n binary trees to determine to which one of the two child nodes of each of the n traversed intermediate nodes to traverse comprises:

concurrently comparing the features of the network content to n feature threshold requirements represented by the n traversed intermediate nodes, for each of the n traversed intermediate nodes, select a first one of the two child nodes of the traversed intermediate node to traverse to if the features of the network content satisfies the feature threshold requirement represented by the traversed intermediate node, and select a second one of the two child nodes of the traversed intermediate node to traverse to if the features of the network content does not satisfy the feature threshold requirement represented by the traversed intermediate node.

16. The method of claim 15, further comprising:

summing, by the one or more computer systems, m scores represented by the m traversed leaf nodes of the m binary trees as a ranking score for the network content, comprising:

initializing the ranking score to 0; and iteratively adding every n of the m scores to the ranking score until all of the m scores are added, adding each n scores to the ranking score comprising concurrently adding the n scores to the ranking score.

17. A system comprising:

a memory comprising instructions executable by one or more processors; and one or more processors coupled to the memory and operable to execute the instructions, the one or more processors being operable when executing the instructions to:

access m binary trees, m denoting an integer greater than or equal to 2, the m binary trees each comprising one or more non-leaf nodes, two or more leaf nodes, and one or more levels, the non-leaf nodes of each of the m binary trees comprising one root node and zero or more intermediate nodes, for each of the m binary trees, the non-leaf nodes each having two child nodes, the intermediate nodes and the leaf nodes each having one parent node, and the levels each comprising one or more of the non-leaf or leaf nodes; and sequentially process every one of the levels of the m binary trees until reaching a leaf node for each the m binary trees, processing each one of the levels of the m binary trees comprising:

determine whether one or more traversed nodes of one or more remaining of the m binary trees at the level are each a non-leaf node or a leaf node, the remaining binary trees each having one of its non-leaf or leaf nodes at the level as one of the traversed nodes, the traversed nodes at the level each being the root node of one of the m binary trees or having been determined as a result of evaluating its parent node;

for the traversed leaf nodes at the level, remove the binary trees to which the traversed leaf nodes belong from the remaining binary trees; and iteratively evaluate the traversed non-leaf nodes at the level of every n of the remaining binary trees until the non-leaf nodes at the level of all of the remaining binary trees are evaluated, n denoting an integer greater than or equal to 2, evaluating the traversed non-leaf nodes of each n binary trees comprising concurrently evaluate the n traversed non-leaf nodes of the n binary trees to determine to which one of the two child nodes of each of the n traversed non-leaf nodes to traverse.

18. The system of claim 17, wherein at each one of the levels of the m binary trees, determining whether the traversed nodes of the remaining binary trees are each a non-leaf node or a leaf node comprises:
iteratively determine the traversed nodes at the level of every n of the remaining binary trees until the traversed nodes at the level of all of the remaining binary trees are determined,
determining the traversed nodes of each n binary trees comprising concurrently determine whether the n traversed nodes of the n binary trees are each an intermediate node or a leaf node.

19. The system of claim 17, wherein processing each one of the levels of the m binary trees further comprises:
iteratively traverse from the traversed non-leaf nodes at the level of every n of the remaining binary trees until the traversed non-leaf nodes at the level of all of the remaining binary trees are traversed,
traversing from the traversed non-leaf nodes of each n binary trees comprising concurrently traverse from the n traversed non-leaf nodes of the n binary trees to the n child nodes of the n traversed non-leaf nodes respectively determined as a result of concurrently evaluating the n traversed non-leaf nodes.

20. The system of claim 17, wherein processing each one of the levels of the m binary trees further comprises pad one or more padding nodes to the traversed nodes at the level so that a total number of the traversed nodes and the padding nodes is divisible by n.

21. The system of claim 17, wherein processing each one of the levels of the m binary trees further comprises pre-fetch the traversed nodes at a next level.

22. The system of claim 17, wherein:
processing each one of the levels of the m binary trees further comprises record the traversed leaf nodes at the level; and
the one or more processors are further operable when executing the instructions to process the m traversed leaf nodes of the m binary trees.

23. The system of claim 17, wherein:
for each of the m binary trees, the non-leaf nodes each represents a feature threshold requirement for a network content feature, and the leaf nodes each represents a score, and
at each one of the levels of the m binary trees, concurrently evaluating the n traversed non-leaf nodes of the n binary trees to determine to which one of the two child nodes of each of the n traversed non-leaf nodes to traverse comprises:
concurrently compare one or more features of a network content to n feature threshold requirements represented by the n traversed non-leaf nodes,
for each of the n traversed non-leaf nodes,
select a first one of the two child nodes of the traversed non-leaf node to traverse to if the features of the network content satisfies the feature threshold requirement represented by the traversed non-leaf node, and
select a second one of the two child nodes of the traversed non-leaf node to traverse to if the features of the network content does not satisfy the feature threshold requirement represented by the traversed non-leaf node.

24. The system of claim 23, wherein the one or more processors are further operable when executing the instructions to:
sum m scores represented by the m traversed leaf nodes of the m binary trees as a ranking score for the network content, comprising:
initialize the ranking score to 0; and
iteratively add every n of the m scores to the ranking score until all of the m scores are added,
adding each n scores to the ranking score comprising concurrently
add the n scores to the ranking score.

25. A system comprising:
a memory comprising instructions executable by one or more processors; and
one or more processors coupled to the memory and operable to execute the instructions, the one or more processors being operable when executing the instructions to:
access m binary trees,
m denoting an integer greater than or equal to 2,
the m binary trees each comprising one root node, zero or more intermediate nodes, two or more leaf nodes, one root level, and one or more subsequent levels, and
for each of the m binary trees, the root node and the intermediate nodes each having two child nodes, the intermediate nodes and the leaf nodes each having one parent node, the root level comprising the root node, and the subsequent levels each comprising one or more of the intermediate or leaf nodes;
process the root level of the m binary trees, comprising iteratively evaluate the root nodes of every n of the m binary trees until the root nodes of all of the m binary trees are evaluated,
n denoting an integer greater than or equal to 2,
evaluating the root nodes of each n binary trees comprising concurrently evaluate the n root nodes of the n binary trees to determine to which one of the two child nodes of each of the n root nodes to traverse; and
sequentially process every one of the subsequent levels of the m binary trees until reaching a leaf node for each the m binary trees, processing each one of the subsequent levels of the m binary trees comprising:
determine whether one or more traversed nodes of one or more remaining of the m binary trees at the subsequent level are each an intermediate node or a leaf node,
the remaining binary trees each having one of its intermediate or leaf nodes at the subsequent level as one of the traversed nodes,
the traversed nodes at the subsequent level each having been determined as a result of evaluating its parent node;
for the traversed leaf nodes at the subsequent level, remove the binary trees to which the traversed leaf nodes belong from the remaining binary trees; and
iteratively evaluate the traversed intermediate nodes at the subsequent level of every n of the remaining binary trees until the traversed intermediate nodes at the subsequent level of all of the remaining binary trees are evaluated, evaluating the traversed intermediate nodes of each n binary trees comprising concurrently evaluate the n traversed intermediate nodes of the n binary trees to determine to which one of the two child nodes of each of the n traversed intermediate nodes to traverse.

26. The system of claim 25, wherein at each one of the subsequent levels of the m binary trees, determining whether the traversed nodes of the remaining binary trees are each an intermediate node or a leaf node comprises:
iteratively determine the traversed nodes at the subsequent level of every n of the remaining binary trees until the traversed nodes at the subsequent level of all of the remaining binary trees are determined,
determining the traversed nodes of each n binary trees comprising concurrently determine whether the n traversed nodes of the n binary trees are each an intermediate node or a leaf node.

27. The system of claim 25, wherein processing each one of the subsequent levels of the m binary trees further comprises:
iteratively traverse from the traversed intermediate nodes at the subsequent level of every n of the remaining binary trees until the traversed intermediate nodes at the subsequent level of all of the remaining binary trees are traversed,
traversing from the traversed intermediate nodes of each n binary trees comprising concurrently traverse from the n traversed intermediate nodes of the n binary trees to the n child nodes of the n traversed intermediate nodes respectively determined as a result of concurrently evaluating the n traversed intermediate nodes.

28. The system of claim 25, wherein:
processing the root level of the m binary trees further comprises pad one or more padding nodes to the root nodes at the root level so that a total number of the root nodes and the padding nodes is divisible by n, and
processing each one of the subsequent levels of the m binary trees further comprises pad one or more padding nodes to the traversed nodes at the subsequent level so that a total number of the traversed nodes and the padding nodes is divisible by n.

29. The system of claim 25, wherein processing each one of the subsequent levels of the m binary trees further comprises pre-fetch the traversed nodes at a next subsequent level.

30. The system of claim 25, wherein:
processing each one of the subsequent levels of the m binary trees further comprises record the traversed leaf nodes at the subsequent level; and
the one or more processors are further operable when executing the instructions to process the m traversed leaf nodes of the m binary trees.

31. The system of claim 25, wherein:
for each of the m binary trees, the root node and the intermediate nodes each represents a feature threshold requirement for a network content feature, and the leaf nodes each represents a score,
at the root level of the m binary trees, concurrently evaluating the n root nodes of the n binary trees to determine to which one of the two child nodes of each of the n root nodes to traverse comprises:
concurrently compare one or more features of a network content to n feature threshold requirements represented by the n root nodes,
for each of the n root nodes,
select a first one of the two child nodes of the root node to traverse to if the features of the network content satisfies the feature threshold requirement represented by the root node, and
select a second one of the two child nodes of the root node to traverse to if the features of the network content does not satisfy the feature threshold requirement represented by the root node, and
at each one of the subsequent levels of the m binary trees, concurrently evaluating the n traversed intermediate nodes of the n binary trees to determine to which one of the two child nodes of each of the n traversed intermediate nodes to traverse comprises:
concurrently compare the features of the network content to n feature threshold requirements represented by the n traversed intermediate nodes,
for each of the n traversed intermediate nodes,
select a first one of the two child nodes of the traversed intermediate node to traverse to if the features of the network content satisfies the feature threshold requirement represented by the traversed intermediate node, and
select a second one of the two child nodes of the traversed intermediate node to traverse to if the features of the network content does not satisfy the feature threshold requirement represented by the traversed intermediate node.

32. The system of claim 31, wherein the one or more processors are further operable when executing the instructions to:
sum m scores represented by the m traversed leaf nodes of the m binary trees as a ranking score for the network content, comprising:
initialize the ranking score to 0; and
iteratively add every n of the m scores to the ranking score until all of the m scores are added,
adding each n scores to the ranking score comprising concurrently add the n scores to the ranking score.

33. One or more computer-readable storage media embodying software operable when executed by one or more computer systems to:
access m binary trees,
m denoting an integer greater than or equal to 2,
the m binary trees each comprising one or more non-leaf nodes, two or more leaf nodes, and one or more levels,
the non-leaf nodes of each of the m binary trees comprising one root node and zero or more intermediate nodes,
for each of the m binary trees, the non-leaf nodes each having two child nodes, the intermediate nodes and the leaf nodes each having one parent node, and
the levels each comprising one or more of the non-leaf or leaf nodes; and
sequentially process every one of the levels of the m binary trees until reaching a leaf node for each the m binary trees, processing each one of the levels of the m binary trees comprising:
determine whether one or more traversed nodes of one or more remaining of the m binary trees at the level are each a non-leaf node or a leaf node,
the remaining binary trees each having one of its non-leaf or leaf nodes at the level as one of the traversed nodes,
the traversed nodes at the level each being the root node of one of the m binary trees or having been determined as a result of evaluating its parent node;
for the traversed leaf nodes at the level, remove the binary trees to which the traversed leaf nodes belong from the remaining binary trees; and iteratively evaluate the traversed non-leaf nodes at the level of every n of the remaining binary trees until the non-leaf nodes at the level of all of the remaining binary trees are evaluated, n denoting an integer greater than or equal to 2, evaluating the traversed non-leaf nodes of each n binary trees comprising concurrently evaluate the n traversed non-leaf nodes of the n binary trees to determine to which one of the two child nodes of each of the n traversed non-leaf nodes to traverse.

34. The media of claim 33, wherein at each one of the levels of the m binary trees, determining whether the traversed nodes of the remaining binary trees are each a non-leaf node or a leaf node comprises:

iteratively determine the traversed nodes at the level of every n of the remaining binary trees until the traversed nodes at the level of all of the remaining binary trees are determined, determining the traversed nodes of each n binary trees comprising concurrently determine whether the n traversed nodes of the n binary trees are each an intermediate node or a leaf node.

35. The media of claim 33, wherein processing each one of the levels of the m binary trees further comprises:

iteratively traverse from the traversed non-leaf nodes at the level of every n of the remaining binary trees until the traversed non-leaf nodes at the level of all of the remaining binary trees are traversed, traversing from the traversed non-leaf nodes of each n binary trees comprising concurrently traverse from the n traversed non-leaf nodes of the n binary trees to the n child nodes of the n traversed non-leaf nodes respectively determined as a result of concurrently evaluating the n traversed non-leaf nodes.

36. The media of claim 33, wherein processing each one of the levels of the m binary trees further comprises pad one or more padding nodes to the traversed nodes at the level so that a total number of the traversed nodes and the padding nodes is divisible by n.

37. The media of claim 33, wherein processing each one of the levels of the m binary trees further comprises pre-fetch the traversed nodes at a next level.

38. The media of claim 33, wherein:

processing each one of the levels of the m binary trees further comprises record the traversed leaf nodes at the level; and the software is further operable when executed by one or more computer systems to process the m traversed leaf nodes of the m binary trees.

39. The media of claim 33, wherein:

for each of the m binary trees, the non-leaf nodes each represents a feature threshold requirement for a network content feature, and the leaf nodes each represents a score, and at each one of the levels of the m binary trees, concurrently evaluating the n traversed non-leaf nodes of the n binary trees to determine to which one of the two child nodes of each of the n traversed non-leaf nodes to traverse comprises:

concurrently compare one or more features of a network content to n feature threshold requirements represented by the n traversed non-leaf nodes, for each of the n traversed non-leaf nodes, select a first one of the two child nodes of the traversed non-leaf node to traverse to if the features of the network content satisfies the feature threshold requirement represented by the traversed non-leaf node, and select a second one of the two child nodes of the traversed non-leaf node to traverse to if the features of the network content does not satisfy the feature threshold requirement represented by the traversed non-leaf node.

40. The media of claim 39, wherein the software is further operable when executed by one or more computer systems to:

sum m scores represented by the m traversed leaf nodes of the m binary trees as a ranking score for the network content, comprising:

initialize the ranking score to 0; and iteratively add every n of the m scores to the ranking score until all of the m scores are added, adding each n scores to the ranking score comprising concurrently add the n scores to the ranking score.

41. A One or more computer-readable storage media embodying software operable when executed by one or more computer systems to:

access m binary trees, m denoting an integer greater than or equal to 2, the m binary trees each comprising one root node, zero or more intermediate nodes, two or more leaf nodes, one root level, and one or more subsequent levels, and for each of the m binary trees, the root node and the intermediate nodes each having two child nodes, the intermediate nodes and the leaf nodes each having one parent node, the root level comprising the root node, and the subsequent levels each comprising one or more of the intermediate or leaf nodes;

process the root level of the m binary trees, comprising iteratively evaluate the root nodes of every n of the m binary trees until the root nodes of all of the m binary trees are evaluated, n denoting an integer greater than or equal to 2, evaluating the root nodes of each n binary trees comprising concurrently evaluate the n root nodes of the n binary trees to determine to which one of the two child nodes of each of the n root nodes to traverse; and sequentially process every one of the subsequent levels of the m binary trees until reaching a leaf node for each the m binary trees, processing each one of the subsequent levels of the m binary trees comprising:

determine whether one or more traversed nodes of one or more remaining of the m binary trees at the subsequent level are each an intermediate node or a leaf node, the remaining binary trees each having one of its intermediate or leaf nodes at the subsequent level as one of the traversed nodes, the traversed nodes at the subsequent level each having been determined as a result of evaluating its parent node;

for the traversed leaf nodes at the subsequent level, remove the binary trees to which the traversed leaf nodes belong from the remaining binary trees; and iteratively evaluate the traversed intermediate nodes at the subsequent level of every n of the remaining binary trees until the traversed intermediate nodes at the subsequent level of all of the remaining binary trees are evaluated, evaluating the traversed intermediate nodes of each n binary trees comprising concurrently evaluate the n traversed intermediate nodes of the n binary trees to determine to which one of the two child nodes of each of the n traversed intermediate nodes to traverse.

42. The media of claim 41, wherein at each one of the subsequent levels of the m binary trees, determining whether the traversed nodes of the remaining binary trees are each an intermediate node or a leaf node comprises:
iteratively determine the traversed nodes at the subsequent level of every n of the remaining binary trees until the traversed nodes at the subsequent level of all of the remaining binary trees are determined,
determining the traversed nodes of each n binary trees comprising concurrently determine whether the n traversed nodes of the n binary trees are each an intermediate node or a leaf node.

43. The media of claim 41, wherein processing each one of the subsequent levels of the m binary trees further comprises:
iteratively traverse from the traversed intermediate nodes at the subsequent level of every n of the remaining binary trees until the traversed intermediate nodes at the subsequent level of all of the remaining binary trees are traversed,
traversing from the traversed intermediate nodes of each n binary trees comprising concurrently traverse from the n traversed intermediate nodes of the n binary trees to the n child nodes of the n traversed intermediate nodes respectively determined as a result of concurrently evaluating the n traversed intermediate nodes.

44. The media of claim 41, wherein:
processing the root level of the m binary trees further comprises pad one or more padding nodes to the root nodes at the root level so that a total number of the root nodes and the padding nodes is divisible by n, and
processing each one of the subsequent levels of the m binary trees further comprises pad one or more padding nodes to the traversed nodes at the subsequent level so that a total number of the traversed nodes and the padding nodes is divisible by n.

45. The media of claim 41, wherein processing each one of the subsequent levels of the m binary trees further comprises pre-fetch the traversed nodes at a next subsequent level.

46. The media of claim 41, wherein:
processing each one of the subsequent levels of the m binary trees further comprises record the traversed leaf nodes at the subsequent level; and
the software is further operable when executed by one or more computer systems to process the m traversed leaf nodes of the m binary trees.

47. The media of claim 41, wherein:
for each of the m binary trees, the root node and the intermediate nodes each represents a feature threshold requirement for a network content feature, and the leaf nodes each represents a score,
at the root level of the m binary trees, concurrently evaluating the n root nodes of the n binary trees to determine to which one of the two child nodes of each of the n root nodes to traverse comprises:
concurrently compare one or more features of a network content to n feature threshold requirements represented by the n root nodes,
for each of the n root nodes,
select a first one of the two child nodes of the root node to traverse to if the features of the network content satisfies the feature threshold requirement represented by the root node, and
select a second one of the two child nodes of the root node to traverse to if the features of the network content does not satisfy the feature threshold requirement represented by the root node, and
at each one of the subsequent levels of the m binary trees, concurrently evaluating the n traversed intermediate nodes of the n binary trees to determine to which one of the two child nodes of each of the n traversed intermediate nodes to traverse comprises:
concurrently compare the features of the network content to n feature threshold requirements represented by the n traversed intermediate nodes,
for each of the n traversed intermediate nodes,
select a first one of the two child nodes of the traversed intermediate node to traverse to if the features of the network content satisfies the feature threshold requirement represented by the traversed intermediate node, and
select a second one of the two child nodes of the traversed intermediate node to traverse to if the features of the network content does not satisfy the feature threshold requirement represented by the traversed intermediate node.

48. The media of claim 47, wherein the software is further operable when executed by one or more computer systems to:
sum m scores represented by the m traversed leaf nodes of the m binary trees as a ranking score for the network content, comprising:
initialize the ranking score to 0; and
iteratively add every n of the m scores to the ranking score until all of the m scores are added,
adding each n scores to the ranking score comprising concurrently add the n scores to the ranking score.

49. A system comprising:
means for accessing m binary trees,
m denoting an integer greater than or equal to 2,
the m binary trees each comprising one or more non-leaf nodes, two or more leaf nodes, and one or more levels,
the non-leaf nodes of each of the m binary trees comprising one root node and zero or more intermediate nodes,
for each of the m binary trees, the non-leaf nodes each having two child nodes, the intermediate nodes and the leaf nodes each having one parent node, and
the levels each comprising one or more of the non-leaf or leaf nodes; and
means for sequentially processing every one of the levels of the m binary trees until reaching a leaf node for each the m binary trees, processing each one of the levels of the m binary trees comprising:
means for determining whether one or more traversed nodes of one or more remaining of the m binary trees at the level are each a non-leaf node or a leaf node,
the remaining binary trees each having one of its non-leaf or leaf nodes at the level as one of the traversed nodes,
the traversed nodes at the level each being the root node of one of the m binary trees or having been determined as a result of evaluating its parent node;
for the traversed leaf nodes at the level, means for removing the binary trees to which the traversed leaf nodes belong from the remaining binary trees; and
means for iteratively evaluating the traversed non-leaf nodes at the level of every n of the remaining binary trees until the non-leaf nodes at the level of all of the remaining binary trees are evaluated, n denoting an integer greater than or equal to 2, evaluating the traversed non-leaf nodes of each n binary trees comprising means for concurrently evaluating the n traversed non-leaf nodes of the n binary trees to determine to which one of the two child nodes of each of the n traversed non-leaf nodes to traverse.

50. A system comprising:

means for accessing m binary trees, m denoting an integer greater than or equal to 2, the m binary trees each comprising one root node, zero or more intermediate nodes, two or more leaf nodes, one root level, and one or more subsequent levels, and for each of the m binary trees, the root node and the intermediate nodes each having two child nodes, the intermediate nodes and the leaf nodes each having one parent node, the root level comprising the root node, and the subsequent levels each comprising one or more of the intermediate or leaf nodes;

means for processing the root level of the m binary trees, comprising means for iteratively evaluating the root nodes of every n of the m binary trees until the root nodes of all of the m binary trees are evaluated, n denoting an integer greater than or equal to 2, evaluating the root nodes of each n binary trees comprising means for concurrently evaluating the n root nodes of the n binary trees to determine to which one of the two child nodes of each of the n root nodes to traverse; and means for sequentially processing every one of the subsequent levels of the m binary trees until reaching a leaf node for each the m binary trees, processing each one of the subsequent levels of the m binary trees comprising:

means for determining whether one or more traversed nodes of one or more remaining of the m binary trees at the subsequent level are each an intermediate node or a leaf node, the remaining binary trees each having one of its intermediate or leaf nodes at the subsequent level as one of the traversed nodes, the traversed nodes at the subsequent level each having been determined as a result of evaluating its parent node;

for the traversed leaf nodes at the subsequent level, means for removing the binary trees to which the traversed leaf nodes belong from the remaining binary trees; and means for iteratively evaluating the traversed intermediate nodes at the subsequent level of every n of the remaining binary trees until the traversed intermediate nodes at the subsequent level of all of the remaining binary trees are evaluated, evaluating the traversed intermediate nodes of each n binary trees comprising concurrently means for evaluating the n traversed intermediate nodes of the n binary trees to determine to which one of the two child nodes of each of the n traversed intermediate nodes to traverse.

* * * * *